United States Patent
Seidman

(10) Patent No.: US 9,740,991 B2
(45) Date of Patent: Aug. 22, 2017

(54) CALCULATING IN-FLIGHT METRICS FOR NON-INTERRUPTIBLE BUSINESS TRANSACTIONS

(75) Inventor: David Isaiah Seidman, Durham, NC (US)

(73) Assignee: CA, Inc., New York, NY (US)

( * ) Notice: Subject to any disclaimer, the term of this patent is extended or adjusted under 35 U.S.C. 154(b) by 1691 days.

(21) Appl. No.: 11/963,183

(22) Filed: Dec. 21, 2007

(65) Prior Publication Data

US 2009/0164270 A1 Jun. 25, 2009

(51) Int. Cl.
G06Q 10/10 (2012.01)
G06Q 10/06 (2012.01)

(52) U.S. Cl.
CPC ......... *G06Q 10/06* (2013.01); *G06Q 10/0639* (2013.01)

(58) Field of Classification Search
CPC ................ G06Q 10/0639; G06Q 10/06315
USPC .............................. 705/1–14; 709/224; 17/60
See application file for complete search history.

(56) References Cited

U.S. PATENT DOCUMENTS

| | | | | |
|---|---|---|---|---|
| 6,186,677 | B1* | 2/2001 | Angel et al. ................. | 717/118 |
| 6,321,264 | B1* | 11/2001 | Fletcher et al. ............. | 709/224 |
| 6,418,467 | B1* | 7/2002 | Schweitzer et al. ......... | 709/223 |
| 6,647,453 | B1* | 11/2003 | Duncan et al. .............. | 710/306 |
| 7,805,510 | B2* | 9/2010 | Bansal et al. ................ | 709/224 |
| 2003/0110007 | A1* | 6/2003 | McGee et al. ............... | 702/179 |
| 2003/0115334 | A1* | 6/2003 | Bhat et al. .................... | 709/227 |
| 2003/0163413 | A1* | 8/2003 | Wiczkowski .................. | 705/38 |
| 2003/0163416 | A1* | 8/2003 | Kitajima ........................ | 705/39 |
| 2005/0049924 | A1* | 3/2005 | DeBettencourt et al. ..... | 705/21 |
| 2005/0240908 | A1* | 10/2005 | Cobb et al. ................... | 717/136 |
| 2006/0265713 | A1* | 11/2006 | Depro et al. ................. | 718/104 |
| 2007/0266148 | A1* | 11/2007 | Ruiz et al. .................... | 709/224 |

OTHER PUBLICATIONS

Jamie Watt, Memento Extends Enterprise Fraud Mandemtne Paltform with High Performance, Real-Time Fraud Detection, Sep. 9, 2009, Business Wire, all pages.*

* cited by examiner

*Primary Examiner* — Beth V Boswell
*Assistant Examiner* — Zahra Elkassabgi
(74) *Attorney, Agent, or Firm* — Vierra Magen Marcus LLP

(57) ABSTRACT

Metrics are calculated from information acquired during execution of transactions for transactions that cannot be identified during execution. In-flight or execution related metrics are grouped by transaction type and time period. The transaction name is associated with the metrics once the transaction has completed, and data is reported for the time period once all transactions executing in that time period have completed. When a transaction has completed execution, in-flight metrics may be determined for the transaction for each time period in which other transactions executing in that time period have completed. When all transactions executing during a particular time period are complete, the in-flight metrics for transactions executing during that time period are determined and stored. The in-flight metrics may include concurrency, stalls and other data.

17 Claims, 24 Drawing Sheets

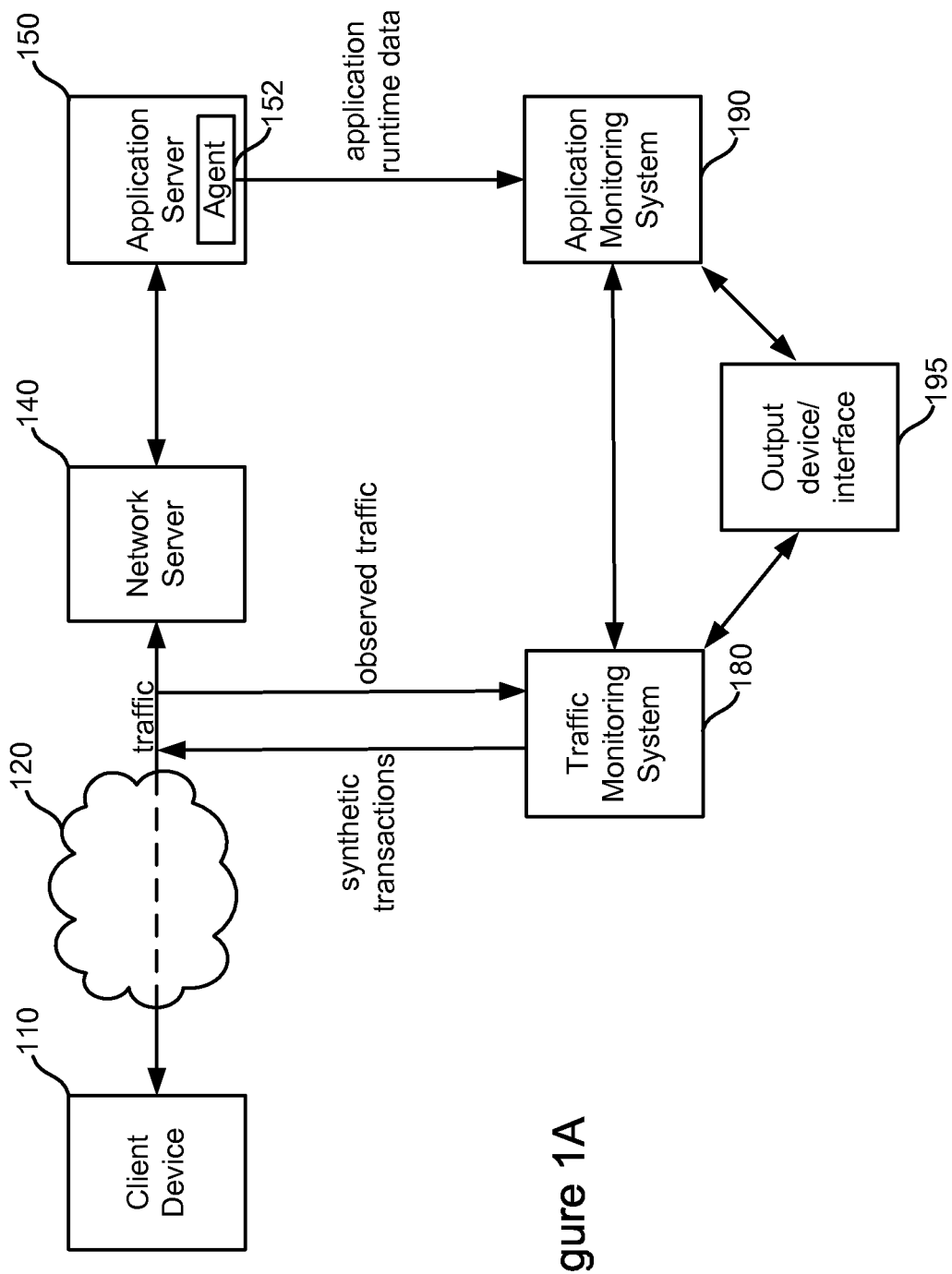

Transaction-Time Period Data
at different elapsed times

| Time elapsed | Transaction | Time period | Stalls | Concurrency |
|---|---|---|---|---|
| 15 s | Transaction 1 | 15 s | 0 | 0 |
| | Transaction 2 | 15 s | 0 | 0 |
| 30 s | Transaction 1 | 15 s | 0 | 1 |
| | Transaction 2 | 15 s | 0 | 1 |
| | Transaction 1 | 30 s | 0 | 1 |
| | Transaction 2 | 30 s | 0 | 1 |
| 45 s | Transaction 1 | 30 s | 0 | 1 |
| | Transaction 2 | 30 s | 0 | 2 |
| | Transaction 1 | 45 s | 0 | 0 |
| | Transaction 2 | 45 s | 0 | 1 |
| 60 s | Transaction 1 | 45 s | 0 | 1 |
| | Transaction 2 | 45 s | 0 | 1 |
| | Transaction 1 | 60 s | 0 | 1 |
| | Transaction 2 | 60 s | 0 | 0 |
| 75 s | Transaction 1 | 45 s | 0 | 1 |
| | Transaction 2 | 45 s | 0 | 2 |
| | Transaction 1 | 60 s | 0 | 1 |
| | Transaction 2 | 60 s | 0 | 1 |
| | Transaction 1 | 75 s | 0 | 0 |
| | Transaction 2 | 75 s | 1 | 1 |

Transaction-Time Period Pair
Data Table

| Transaction | Time period | Stalls | Concurrency |
|---|---|---|---|
| Transaction 1 | 15 s | 0 | 1 |
| Transaction 2 | 15 s | 0 | 1 |
| Transaction 1 | 30 s | 0 | 1 |
| Transaction 2 | 30 s | 0 | 2 |
| Transaction 1 | 45 s | 0 | 1 |
| Transaction 2 | 45 s | 0 | 2 |
| Transaction 1 | 60 s | 0 | 1 |
| Transaction 2 | 60 s | 0 | 1 |
| Transaction 1 | 75 s | 0 | 0 |
| Transaction 2 | 75 s | 1 | 1 |

CALCULATING IN-FLIGHT METRICS FOR NON-INTERRUPTIBLE BUSINESS TRANSACTIONS

BACKGROUND

The growing presence of the Internet as well as other computer networks such as intranets and extranets has brought many new applications in e-commerce and other areas. Organizations increasingly rely on such applications to carry out their business or other objectives, and devote considerable resources to ensuring that the applications perform as expected. To this end, various application management techniques have been developed.

Some application monitoring systems determine metrics for transactions performed by applications. The metrics may reflect the current status of the transaction or results of the transaction. In some transactions, the identity of the transaction cannot accurately be determined while the transaction is executing. Metrics reflecting the current status of a transaction that cannot be identified during transaction execution are typically not provided by application monitoring systems.

SUMMARY

The technology described herein pertains to calculating metrics from information acquired during execution of a transaction for transactions that cannot be identified during execution. These "in flight" transaction metrics are grouped for a transaction by time period. For example, metrics may be reported for a transaction for a first time period from T1-T2, a second time period from T2-T3, and so forth. The transaction name is associated with the metrics once the transaction has completed, and data is reported for the time period once all transactions executing in that time period have completed.

A record or some other set of data is generated and stored for the transaction when the transaction begins and for each time period in which the transaction is executing. When initially created, a record does not contain the identification of the transaction. When the transaction completes, identification information for the transaction is determined and added to each record associated with the transaction. When all transactions executing during a particular time period are complete, the in-flight metrics for transactions executing during that time period are determined and stored.

An embodiment monitors the performance of two or more transactions performed at least in part by an application. Completion of a first transaction of the two or more transactions is detected and a first time period of one or more consecutive time periods is selected, where the first transaction was performed during the one or more consecutive time periods. A determination is then made as to whether a set transactions executing during the first time period are complete. The two or more transactions include the set of transactions. One or more metrics are then determined based on whether the set of transactions are complete.

One embodiment stores performance data for a first transaction for one or more discrete periods of time. The performance data does not include the name of the first transaction. Completion of a first transaction is detected and a determination is made as to whether any additional transactions occurring in a selected period of time of the one or more discrete periods of time are not complete. Based on whether or not any additional transactions are not complete, metrics are calculated for the completed first transaction.

An embodiment reports performance data for one or more transactions performed by an application. The performance data is associated with transactions that cannot be identified during execution of the transactions. A detection is made that a first transaction of the one or more transactions has completed and identification data for the first transaction is retrieved in response to detecting the transaction completion. A selection is made of a first time period of one or more consecutive time periods during which the first transaction was executing and one or more metrics for the first transaction and the first time period are determined.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram of an embodiment of a network monitoring system which monitors a network service.

FIG. 20 is an example of stall and concurrency data at different times.

FIG. 21 is an example of a table of stall of concurrency data for a different business transaction—time period pairs.

DETAILED DESCRIPTION

Figure 1B:
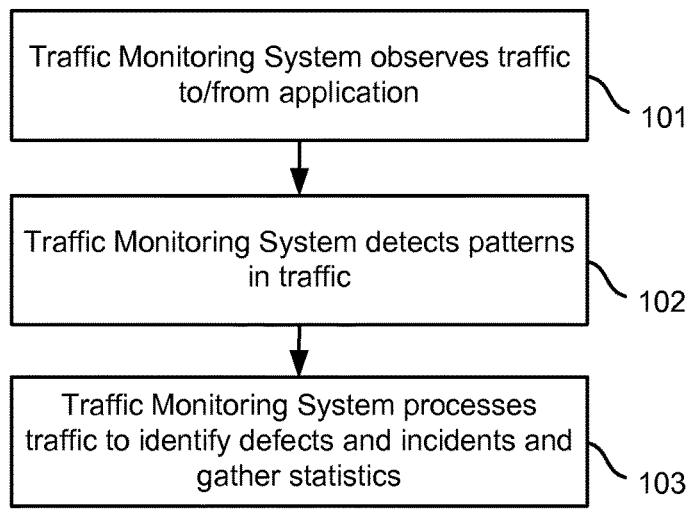
FIG. 1B illustrates a flowchart of an embodiment of a process by which a traffic monitoring system monitors traffic.

A system calculates metrics from information acquired during execution of a transaction for transactions that cannot be identified during execution. The transaction metrics provide information for the transaction while executing and can be aggregated by transaction and time period. For example, metrics may be reported for a transaction for a first time period from T1-T2, a second time period from T2-T3, and so forth. Transaction identification information is appended to a set of data that includes the transaction metrics once the transaction has completed. After adding transaction identification information to the set of data, the transaction metrics can be reported for the time period once all transactions executing in that time period have completed.

A record or some other set of data is generated and stored for the transaction when the transaction begins and for each time period in which the transaction is executing. When initially created, a record does not contain the identification of the transaction. When the transaction completes, identification information for the transaction is determined and added to each record associated with the transaction. When all transactions executing during a particular time period are complete, the in-flight metrics for transactions executing during that time period are determined and stored.

In flight transaction metrics may include stalled transactions, concurrency and other metrics. A stalled transaction is a transaction that does not complete within a specified period of time. In some embodiments, a stall threshold may be set for one or more transactions monitored by a monitoring system. If a transaction execution time exceeds a stall threshold (or the stall threshold is otherwise not satisfied by the executing transaction), the transaction is determined to be stalled within the time period it exceeds the threshold and for any time period afterwards in which it is still executing. Concurrency is an indication of how many threads are executing an instance of a transaction, component or method during a time period. For example, if two requests or invocations have been made to a particular EJB during a time period, then two threads are executing for the EJB and the EJB has a concurrency of two within the time period. Thus, concurrency is an indication of how many instances or threads are being executed to process requests or invocations of a particular component or a method of a transaction.

Metrics may be tracked for transactions or components. In some embodiments, the metrics may be tracked for a transaction performed in response to a request received from a client device, server, or some other entity. Transactions are discussed below for purposes of example. It is intended that the metrics may be created and processed for transaction components, methods and other elements in addition to the transactions discussed below.

Network Service Monitoring

The present technology may be implemented at least in part by a network service monitoring system that monitors a network service such as a web service, though other network services may be monitored as well. Generally, a network service can be provided over the Internet, an intranet, an extranet, a private network or other network or networks and is not limited to network services which are provided via the World Wide Web. Although some examples discussed below reference a web service, the technology discussed herein applies generally to other services that are connected to or in communication with a network or other means of communication.

The network service monitoring system may include multiple monitoring systems such as, in one embodiment, a traffic monitoring system and an application monitoring system. The traffic monitoring system may observe network traffic sent and received by a network service, may have a variety of architectures and may monitor traffic provided according to any type of network protocol. The observed traffic may be processed as discussed in more detail below to provide traffic monitoring data. An example network monitoring system is discussed below in connection with FIG. 1A. Logical operation of a traffic monitoring system is discussed below with respect to FIG. 1B.

In some embodiments, a synthetic transaction generating system may be implemented as a separate system from the network monitoring system. Thus, a synthetic transaction generating system may reside one the client side of the network illustrated in FIG. 1A.

The application monitoring system may monitor the execution of one or more applications of the network service. For example, the application monitoring system may monitor the performance of one or more applications and/or application components and generate corresponding application runtime data which identifies, e.g., components which are invoked in one or more execution paths such as threads and/or processes of the application. For example, the components can include servlets, Java Server Pages, Enterprise Java Beans Java Database Connectivity components and/or Microsoft .NET components. The application runtime data can provide a transaction trace, for example, which indicates the time intervals in which the components were invoked. Logical operation of an application monitoring system is discussed in more detail below with respect to FIG. 1C.

Processing observed traffic and application runtime data may include associating the two types of data so that related traffic monitoring data and application runtime data can be correlated and selectively accessed. In this way, an operator can quickly navigate through the data to obtain relevant information, such as information for diagnosing an anomalous condition.

Thus, an operator may obtain information regarding network service performance "from the outside" by viewing the observed traffic (e.g., from the perspective of a client interacting with the network service) as well as "from the inside" (e.g., from the perspective of the execution of components of the application). By viewing a network service from the inside and outside, the operator has more information from which to monitor, manage and diagnose the performance and health of a network service.

For example, the traffic monitoring data can characterize a user's interaction with an application from the user's perspective, that is, by answering the question: "What is the impact of the application on the user?" The application runtime data can characterize the application from a perspective of individual software components that are invoked in the application. Such component level data allows a programmer or other specialists to diagnose a problem and implement a fix, e.g., by patching or otherwise revising the application, repairing or replacing hardware, reallocating resources, etc. The traffic monitoring data and application runtime data can also be used separately, in a non-integrated manner. Generally, the application runtime data focuses on diagnosis of a problem, e.g., finding the root cause of a problem, while the traffic monitoring data focuses on user impact.

Further, traffic monitoring data and application runtime data can be classified according to one or more hierarchies which characterize client interactions with an application. For instance, a hierarchy may characterize the interactions according to a business model for an e-commerce application. This allows the traffic monitoring data and application runtime data to be presented in a user-friendly manner which is tailored to the needs of a particular organization and individuals in the organization.

FIG. 1A is a block diagram of an embodiment of a network monitoring system which monitors a network service. The network service includes an example network server 140 and an example application server 150. In practice, any number of servers or other computing devices which are connected in any configuration can be used. Network server 140 sends traffic to and receives traffic from an example client device 110 over a network 120, such as the Internet or other WAN, a LAN, intranet, extranet, private network or other network or networks. In practice, a number of client devices can communicate with the network server 140.

Application server 150 may be in communication with network server 140. In particular, when network server 140 receives a request from client device 110, network server 140 may relay the request to application server 150 for processing. The client device 110 can be a laptop, PC, workstation, cell phone, PDA, or other computing device which is operated by an end user. Or, the client device can be an automated computing device such a server. Application server 150 processes the request received from the network server 140 and sends a corresponding response to the client device 110 via the network server 140.

The network monitoring system also includes traffic monitoring system 180 and an application monitoring system 190. In one possible approach, the application monitoring system uses one or more agents, such as agent 152, which is considered part of the application monitoring system 190, though it is illustrated as a separate block in FIG. 1A. Traffic monitoring system 180 observes traffic sent between client device 110 and network server 140, including requests sent from client device 110 and corresponding responses received by the client device 110. Agent 152 and application monitoring system 190 monitor the execution of one or more applications at the application server 150, generate application runtime data, which represents the execution of components of the application responsive to the requests, and process the generated application runtime data. In some embodiments, application monitoring system 190 may be used to monitor the execution of an application or other code at some other server, such as network server 140. An output device/interface 195 may communicate with the traffic monitoring system 180 and the application monitoring system 190 for presenting reports and other data to an operator and for receiving inputs from the operator. The traffic monitoring system 180 and the application monitoring system 190 may have independent interfaces or may share a common interface.

FIG. 1B illustrates a flowchart of an embodiment of a process by which traffic monitoring system 180 of FIG. 1A monitors traffic. Note that in this and the other flowcharts provided, the steps indicated are not necessarily performed one at a time in the order indicated, but may occur simultaneously, at least in part, and/or in another order. Traffic sent to and from an application, such as traffic sent between client device 110 and web server 140 over network 120, for instance, is observed by traffic monitoring system 180 at step 101. The observation can involve passively copying the traffic at some intermediate point between the client and the application via a tap or mirror port, for instance, or intercepting the traffic, copying the intercepted traffic and relaying the intercepted traffic it to its intended destination.

At step 102, the traffic monitoring system 180 detects patterns in the traffic and may use this information to group traffic into an object hierarchy. For example, this can involve recognizing application requests and responses, relating or binding corresponding request-response pairs into transaction components (for example an HTML file or an image file), binding transaction components into transactions (for example a web page with an HTML file and zero or more image files), binding transactions into user-specific tasks that may be called business transactions (for example an application's login business transaction may retrieves one or more web pages). Similarly, business transactions can be bound to a business process, and business processes can be bound to a domain. The domain, business processes, business transactions, transactions and transaction components may be part of one or more hierarchies which are defined for classifying the observed traffic. A business process includes one or more business transactions, and a domain includes one or more business processes.

Also, a transaction component may itself be a transaction and require no component-to-transaction binding, for example, where a web page transaction contains no additional components, or where additional components exist but are not defined as part of the transaction. Binding may be accomplished through a simple table lookup, where a list of transaction components is related to a transaction, for example. Another example of a binding mechanism may be through such a list used with a session identifier, where only transactions or transaction components sharing a common session identifier may be bound together. Further related information can be found in U.S. patent app. publication no. 2003/0191989 to P. O'Sullivan, published Oct. 9, 2003, titled "Methods, systems and computer program products for triggered data collection and correlation of status and/or state in distributed data processing systems," and incorporated herein by reference.

Transactions can be detected based on transaction definitions which specify the existence or non-existence or combination thereof of a set of name/value pairs, e.g., parameters, which are found in the traffic. For example, parameter specification may include a matching type, a parameter type (e.g., URL, cookie, post, or query, or session), a name pattern, and a value pattern. URL parameters include name/value pairs that appear in the HTTP request line before the first "?" character or in special request headers such as the Host: request header. Cookie parameters include name/value pairs that appear in the Cookie: request header. Post parameters include name/value pairs that appear in the HTTP POST request-body. Query parameters include name/value pairs that appear in the HTTP request line after the first "?" character. Session managers, such as the eTrust® SiteMinder available from CA, Inc., Islandia, N.Y. uses a cookie parameter to hold an encoded or encrypted value, which in turn holds session specific name/value pairs. Session parameters include name/value pairs that appear in such an encoded or encrypted value. Name and value specifications may specify an exact value for exact matching or a pattern for pattern matching. Any form of pattern matching may be used, from simple wild-card pattern matching to more complex regular expression pattern matching.

In particular, an operator can define a hierarchy for organizing the traffic monitoring data which is obtained by the traffic monitoring system, e.g., through an interface or other means. For example, an operator may use an interface to generate the hierarchy from a set of parameters obtained from the observed traffic. The parameters can be designated as belonging to one or more levels of the hierarchy as discussed in more detail below with respect to FIG. 3 and FIG. 10B. In this manner, traffic monitoring data can be accessed according to the classification provided by the hierarchy to facilitate diagnosis of anomalies and understanding of application and network performance.

At step 103, the traffic monitoring system processes the traffic to identify defects and incidents and gather statistics. A defect generally indicates an anomalous condition of a request-response pair. Moreover, an incident can be set when one or more related defects are set. An incident may be a cause for concern which should be analyzed further. The one or more defects of an incident can be associated when they are caused by the same factors, for instance. For example, an incident may be associated with a group of one or more defects having the same defect type, or affecting the same business transaction or group of users. In some cases, a defect such as a slow response to a request may not be sufficient to set an incident, but a specified number of such defects may be sufficient. In other cases, a single occurrence of a type of defect may be sufficient to set an incident.

In one approach, defects can be detected by evaluating a request-response pair against defect criteria which may specify transaction types, a range of acceptable response times, and/or other parameters, for instance. For example, when the defect criteria specifies a range of acceptable response times within which a response may be received after a request is sent, the request-response pair is defective if the response time falls outside the specified range. Similarly, when the defect criteria specify a range of unacceptable response times, the request-response pair is defective if the response time falls within the specified range. Moreover, defect criteria can be specified for transaction components, transactions and/or business transactions.

Furthermore, defect data and statistics can be aggregated for a number of request-response pairs and classified according to the hierarchy. The aggregated statistics and defects can then be processed to enable other functionality of the present technology and stored for access by an operator through an interface or other appropriate output.

Figure 1C:
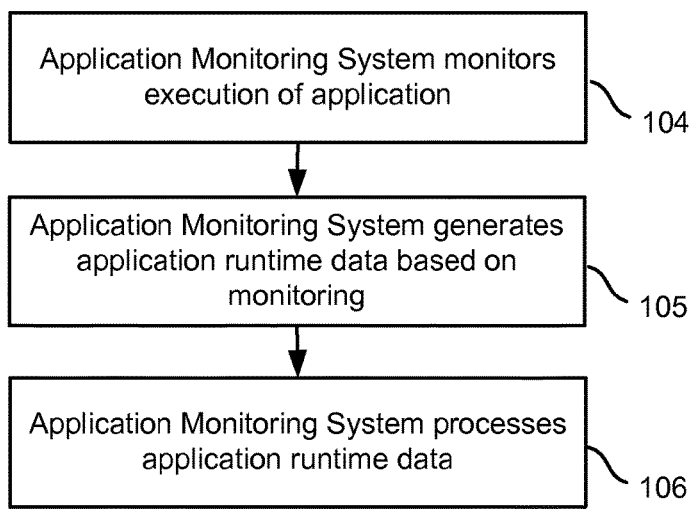
FIG. 1C illustrates a flowchart of an embodiment of a process by which an application monitoring system monitors an application.

FIG. 1C illustrates a flowchart of an embodiment of a process by which the application monitoring system 190 of FIG. 1A monitors an application. An application is monitored by application monitoring system 190 at step 104. Monitoring may involve agent 152 determining which components of application server 150 are invoked and the duration in which they are invoked when the application processes a client request, as discussed in more detail below with respect to FIG. 4 and FIG. 11.

Application runtime data based on the monitoring of the application is generated at step 105. The generated application runtime data can indicate the application components involved in processing a request, the duration that each component consumed in processing a request, and other information. The application runtime data can be generated by agent 152, in one possible approach, after which the agent 152 may forward the generated application runtime data to application monitoring system 190, which can exist outside of application server 150, in one embodiment. Generating and reporting application runtime data is discussed in more detail below with respect to FIG. 4 and FIG. 11.

The application runtime data is processed by application monitoring system 190 at step 106 such as by aggregating the data, storing the data, and providing the data to an operator through an interface or other output.

Further, traffic monitoring system 180 and application monitoring system 190 may communicate with each other to enable association of the traffic monitoring data and application runtime data. The association allows an operator to access information which characterizes the network service from the "outside" via the traffic monitoring data and from the "inside" of the network service via the application runtime data. This provides the operator with a powerful insight into how a network service processes requests (the inside perspective) and the effect of the network service on a customer or other user or network component (the outside perspective).

In some embodiments, the traffic and application monitoring systems may be used together, e.g., integrated, to provide diagnostics, statistics and other data regarding the operation of a web service, network system or other system. The integrated data may be analyzed by an operator or administrator, viewed in reports, and processed to identify system health, performance or other issues of concern, for instance.

In one embodiment, integrating the data allows business information associated with a number of web service requests and corresponding responses to be associated with application runtime data. For example, consider a number of requests received daily by a web service of a bank to open new user accounts. The integrated traffic monitoring and application runtime data may provide aggregated information regarding the content of the requests and responses and timing information (e.g., response times) for the transactions from the requesting users' point of view, as well as detailed information regarding the execution of the application such as information regarding application components which are invoked and timing information regarding how the requests were processed and the responses were generated. Generally, application runtime data can include information such as average method execution time, a method invocation rate per second or per interval, a count of method invocations, a concurrency metric indicating number of method invocations that have started but not finished per interval, and a stalled metric indicating a number of method invocations that have started whose method invocation times have exceeded a specific threshold per interval. Further, application runtime data can identify a garbage collection heap size, a bandwidth metric indicating file and socket activity, a number of threads, system logs, exceptions, memory leaks and component interactions. The traffic monitoring data and application runtime data can be aggregated over many requests and responses to obtain valuable trend information without the need to save data for each specific request and response. However, traffic monitoring data and application runtime data for a specific request and response can be saved, e.g., if an anomalous condition is detected, to allow a detailed analysis of a specific request-response pair on an as-needed basis. The integrated data may be accessed through the traffic monitoring system, the application monitoring system or some other system, and/or provided to another system, device or program code for further processing.

Below, an architecture for a traffic monitoring system and application monitoring system is discussed generally and then in more detail with respect to FIGS. 1D-5. Operation of the monitoring systems is discussed with respect to FIGS. 6-11. Exemplary methods of integrating traffic monitoring data and application runtime data are discussed with respect to FIGS. 12A-13.

Figure 1D:
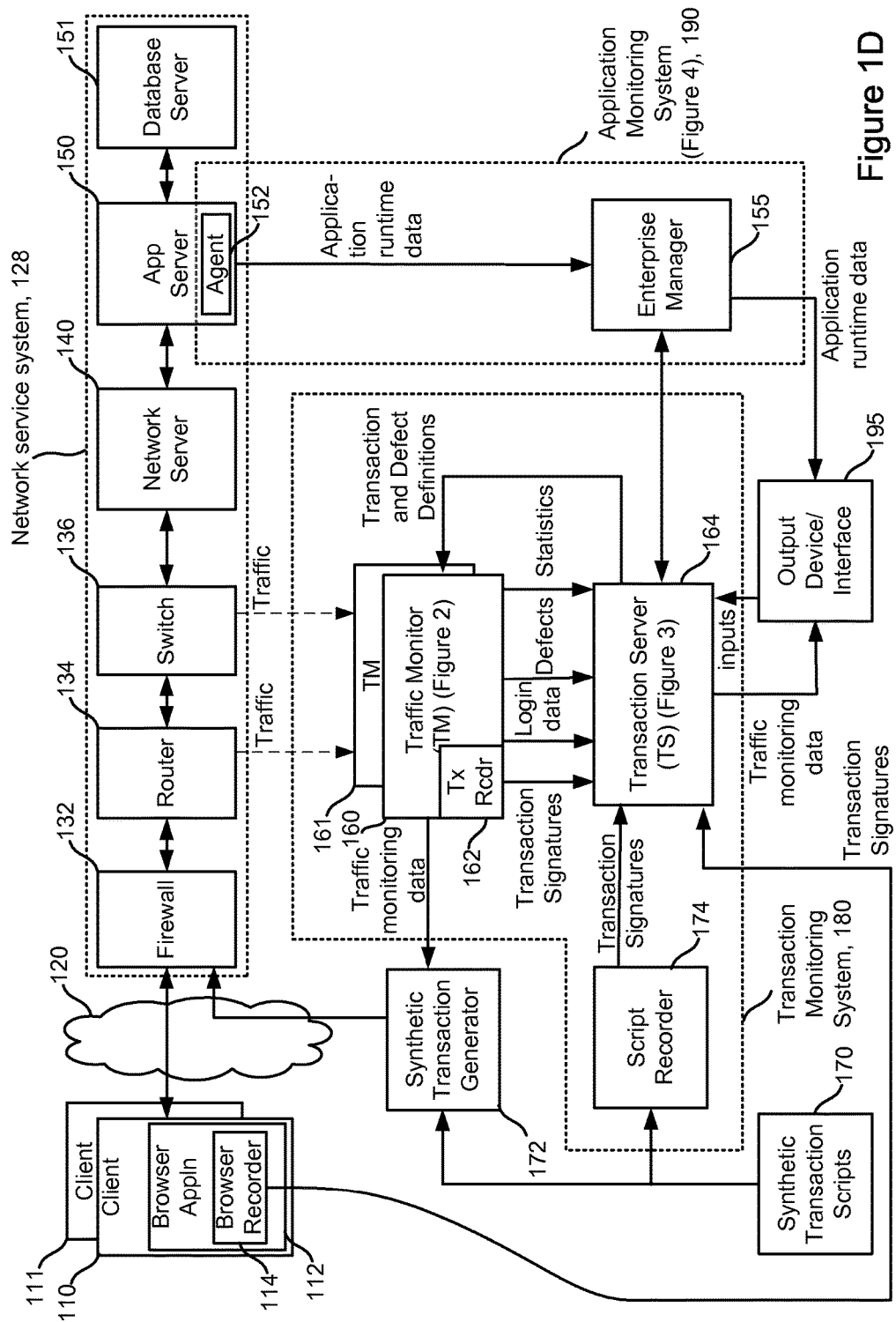
FIG. 1D is a block diagram of an embodiment of a system for monitoring a network service.

FIG. 1D is a block diagram of an embodiment of a system for monitoring a network service. A network service system 128, traffic monitoring system 180, and application monitoring system 190 are provided. The network service system 128 includes firewall 132, router 134, switch 136, network server 140, application server 150 and database server 151. Client 110 may send requests to and receive responses from the network service system over one or more networks such as network 120. Traffic monitoring system 180 collects data regarding network service system traffic and application monitoring system 190 collects data regarding execution of the application at the application server 150.

In the embodiment illustrated, client 110 includes browser application 112, which may be implemented, e.g., as a web browser or other network browser. In some embodiments, browser application 112 may include browser recorder 114 which records browser requests, headers and content data received from network server 140, translates the browser content data into transaction signatures, and transmits the signatures to transaction server 164. Transactions signatures and recorders are discussed in more detail below. In some embodiments, more than one client, as illustrated by additional client 111, may communicate with network server 140 to send traffic to and receive traffic from network server 140. In some embodiments, a client can be a server computer or other computer. In this case, requests need not originate from a browser or as a result of human interaction. In any case, the recorder 114 can record requests, headers and content for the client device.

Traffic sent over network 120 from client 110 may pass through firewall 132, router 134 and switch 136 before reaching network server 140, in one possible network topology. In practice, more complex or less complex topologies may be used. Firewall 132 may be implemented as a set of one or more related programs located on a network gateway server that protects the resources of the servers and devices inside a private network. Incoming traffic received by firewall 132 can be analyzed to determine if it is safe before it is sent toward network server 140.

Router 134 may be implemented as a device or software within a device and can be connected to more than one other device. Router 134 determines the next network point or device to which an information packet should be forwarded based on its understanding of the state of the network or networks to which it is connected. Switch 136 channels incoming data from any of multiple input ports to the specific output port that will take the data towards its intended destination, e.g., based on an Internet Protocol or IP address in each received packet.

Traffic sent by client 110 is received by network server 140 and may be processed by network server 140. Network server 140 may optionally send requests to one or more other servers to process the received traffic, such as application server 150, database server 151 or other backend servers (not illustrated in FIG. 1D). In response to a request received from browser application 112, network server 140 provides a response with web page content, for instance, to browser application 112. Network server 140 is in communication with client 110 (through devices 132-136) and with application server 150. Application server 150, which can include one or more application programs that provide business logic, for instance, is in communication with network server 140 and database server 151. Database server 151 is in communication with application server 150 and stores network service system information and other information for responding to client requests. The stored information is configured to be accessed, managed and updated by application server 150 and other devices and/or programs.

The network service system processes a request received from client 110 such as by sending the request to application server 150 which, in turn, generates a response and provides it to network server 140. In some cases, application server 150 may access database server 151 or some other backend server to process the request. Network server 140 transmits the response to the client 110 through switch 136, router 134, firewall 132 and network 120.

Traffic monitoring system 180 may monitor the traffic associated with the request and corresponding response at any desired location such as between client 110 and network server 140. Traffic monitoring system 180 includes traffic monitor (TM) 160, transaction server (TS) 164, script recorder 174, and browser recorder 114. In some embodiments, there may be more than one traffic monitor, as illustrated by additional traffic monitor 161. In one approach, each traffic monitor can monitor a different server, such as a web server or application server. Moreover, the monitoring duties may be divided among multiple monitors according to different ranges of network addresses. One or more traffic monitors may report information to transaction server 164. Thus, one transaction server may receive information from more than one traffic monitor, in one approach.

Traffic monitor 160 observes the traffic and can perform tasks such as determining whether portions of the traffic qualify as a defect, identifying user information in a transaction, and generating defects and statistics information. Traffic monitor 160 may observe the traffic at router 134, e.g., through a passive tap, at switch 136, e.g., via a mirror port, or some other point in the route traversed by the traffic. Traffic monitor 160 is described in more detail below with respect to FIG. 2.

Transaction server 164 receives login data, statistics and defects information from traffic monitor 160, receives transaction signatures from one or more recorders, generates transaction and defect definitions, provides the definitions to traffic monitor 160, and provides traffic monitoring data to an operator regarding the observed traffic. Transaction signatures provide information for transactions monitored by a particular recorder and are used by transaction server 164 to generate transaction definitions and defect definitions. Transaction server 164 provides the definitions to traffic monitor 160 for use in detecting transactions and determining whether they are defective. The transaction data may be provided to an operator through an output device/interface 195 to allow the operator to view reports with traffic monitoring data and application runtime data, generate and modify transaction and defect definitions, and perform other tasks. Transaction server 164 is discussed in more detail below with respect to FIG. 3.

The transaction signatures received by transaction server 164 can be sent by one or more transaction recorders. A transaction signature is a set of data that describes a particular transaction. In one embodiment, a transaction includes one or more request-response pairs. For example, a transaction may include a request by a client browser application for a login page from a web service system, and the corresponding response from the system that includes the login page content to be rendered by the client browser. The transaction signature that describes the transaction may include the request header data, request body data, the user data contained in the request, a request identifier, the source of the request, the recipient of the request, and corresponding information in the response (e.g., header, body, source of response, intended recipient).

An operator may use an interface to generate transaction definitions from transaction signatures, e.g., by viewing transaction signature data through the interface, modify the transaction signature data if desired, and selecting or "promoting" the transaction signature data to a transaction definition. The transaction definition may then be used to identify valid transactions in subsequently observed traffic. For example, assume a user "Bob" is logging on to a corporate intranet site to submit a form to the human resources department. Transaction definitions can be set which identify Bob's login transaction and the form submission transaction as two distinct transactions. Moreover, the promotion can also remove "Bob" as a specific user. Generating transaction definitions from transaction signatures is discussed in more detail below.

One or more recorder can be used to provide the transaction signatures by capturing transaction data (for example, a request observed at a client which generated the request or observed in network server system traffic), translating the transaction data into transaction signatures, and transmitting the signatures to transaction server 164. For example, a client request can be translated into a transaction signature by extracting identification parameters such as HTTP parameters (name/value pairs) from the request. Moreover, different types of recorders can be used, such as comprehensive recorders, standard recorders, and script recorders. A comprehensive recorder may be implemented on any machine, such as an administrator console or a machine which performs live transactions. For example, the transaction recorder (Tx Rcdr) 162 which is provided as part of the traffic monitor 160 may be considered to be a comprehensive recorder. A standard recorder may be implemented on the same machine which performs live transactions (such as within a browser). For example, the browser recorder 114 may be considered to be a standard recorder. Script recorders, such as script recorder 174, use pre-recorded network packet capture files and test script output files to create transaction signatures.

In one embodiment, transaction server 164 receives transaction signatures from browser recorder 114 within browser application 112, script recorder 174, and transaction recorder (Tx Rcdr) 162 within traffic monitor 160. Browser recorder 114 may be a standard recorder or a browser plug-in. The browser plug-in records a web page and page components as they are loaded into browser application 112. Browser recorder 114 then translates the page and page components into a transaction signature and transmits the transaction signature to transaction server 164. Transaction recorder 162 records transaction signatures from monitored traffic. Script recorder 174 may receive transaction scripts. A transaction script is a set of script commands that can be executed to perform one or more transactions at a client communicating with a network system. For example, a transaction script may include script commands to request a network service login page, and provide login user information in response to receiving the login page. In some embodiments, each script command may also include parameters and other data to complete each request. For example, a login request may include data for a user name and password. In some embodiments, the transaction scripts may be provided in a log file or some other script file. Script recorder 174 translates the transaction scripts into transaction signatures and transmits the signatures to transaction server 164. One example of a script recorder uses a script generated by "Mercury LoadRunner," software, available from Mercury Interactive Corporation, of Mountain View, Calif.

Transaction server 164 may also communicate and exchange information with Enterprise Manager 155 such as hierarchy information, statistics and defects information and other information, as discussed in more detail below.

Application monitoring system 190 may monitor execution of an application based on the traffic received by the application, generate application runtime data and process the generated data. As discussed above with respect to FIGS. 1A and 1C, application monitoring system 190 may include Enterprise Manager 155 and Agent 152 and is in communication with application server 150 and traffic monitoring system 180. Application monitoring system 190 is discussed in more detail below with respect to FIG. 4.

Output device/interface 195, which may include an on-screen interface, for instance, may receive traffic monitoring data from traffic monitoring system 180 and application runtime data from application monitoring system 190 for access by an operator. The interface 195 also allows the operator to provide inputs to the transaction server 164, e.g., to provide transaction definitions or other configuration settings.

Synthetic transaction generator 172 may generate synthetic transactions for network server 140, e.g., in response to receiving synthetic transaction scripts from synthetic transaction script module 170. The synthetic transaction scripts can also be received by script recorder 174, which records the scripts, translates the scripts into transaction signatures, and forwards the generated transaction signatures to transaction server 164. The synthetic transaction generator 172 may be provided as part of the traffic monitoring system or as a component that works with the traffic monitoring system and/or the application monitoring system. The synthetic transactions may be injected into the traffic received by network server 140. Generating synthetic transactions may begin with observing traffic for a network service, and determining the scope and frequency of the traffic, in particular, the scope of a network functionality tested by the observed traffic as well as the frequency with which the traffic scope is tested. Synthetic transactions may be generated to test network service functionality based on a comparison of actual traffic scope and/or frequency to target scope and/or frequency. For example, if a particular function of an application is not being tested frequently enough by the actual users of the network service, synthetic transactions can be generated to test the function. In some embodiments, the synthetic transactions may also be based on application runtime data which may be processed to determine the scope and frequency with which application components are tested by the observed network traffic.

Figure 2:
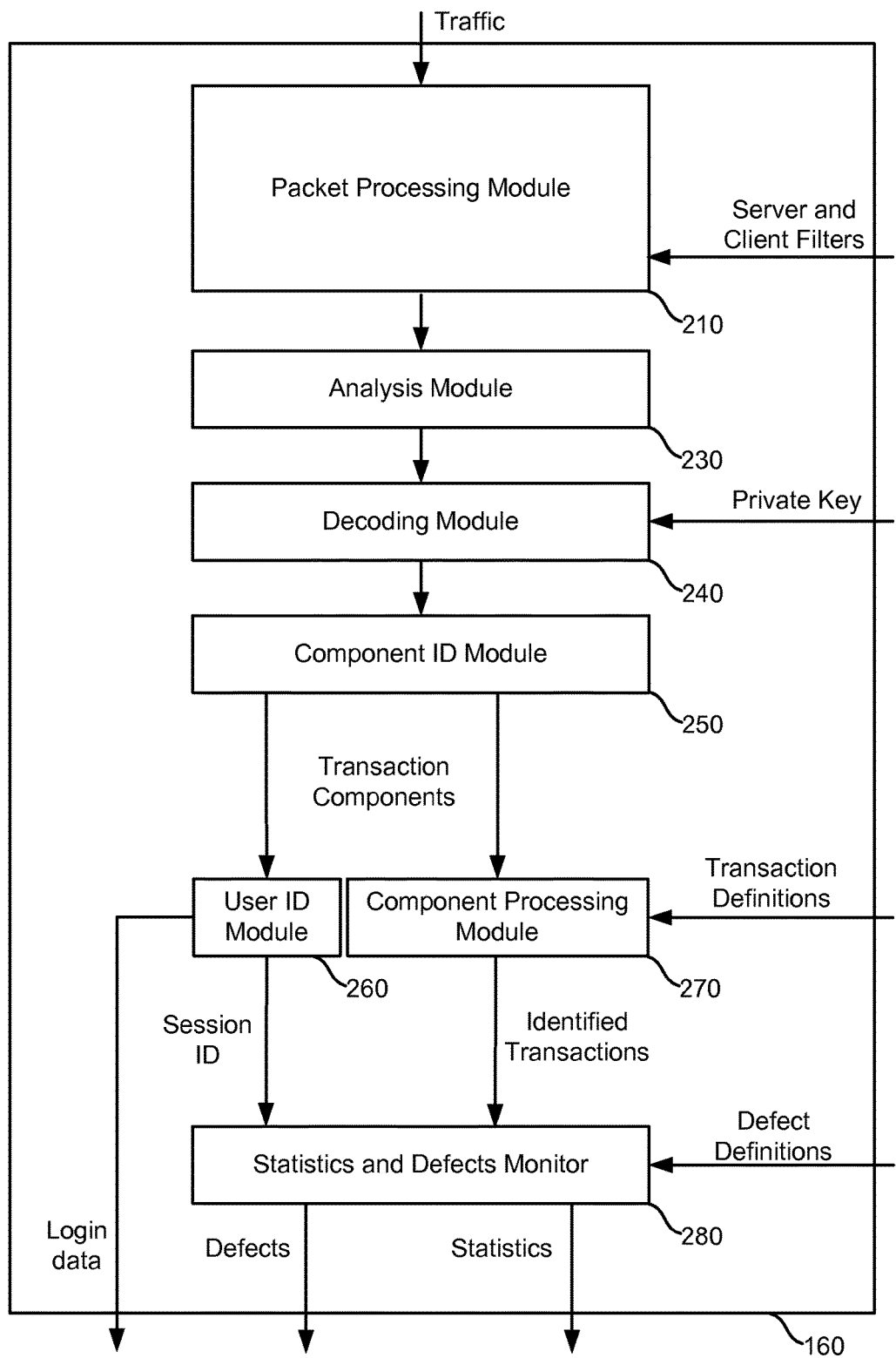
FIG. 2 is a block diagram of an embodiment of a system for processing network traffic.

FIG. 2 is a block diagram of an embodiment of a system for processing observed network traffic. In one embodiment, FIG. 2 provides detail of software modules for implementing the traffic monitor 160 of FIG. 1D. Operation of traffic monitor 160 is also discussed with respect to FIGS. 8 and 9.

As discussed above, traffic monitoring system 180 may be used to observe and process network traffic using any protocol, including but not limited to HTTP and HTTPS. Portions of the discussion below that reference HTTP and/or HTTPS, or any other protocol, are provided for purposes of example and should not be construed to limit application of the present technology.

Traffic monitor 160 includes packet processing module 210, analysis module 230, decoding module 240, component ID module 250, user ID module 260, component processing module 270 and statistics and defects monitor 280. Packet processing module 210 captures and filters traffic packets. In some embodiments, observing traffic may include receiving a copy of the traffic which is received by router 134, switch 136 or some other point in the path of traffic between client 110 and web server 140. In some embodiments, traffic may also be observed at a device existing between network server 140 and application server 150, or between application server 150 and database server 151. The observed traffic may be received as unordered packets of traffic provided according to HTTP, HTTPS or some other format. Packet processing module 210 may also receive one or more server and/or client filters for filtering the captured traffic as discussed in more detail below with respect to FIG. 8.

The analysis module 230 may reconstruct a data stream according to its format, e.g., TCP/IP, from filtered unordered packets received from packet processing module 210. The reconstructed data stream may include requests and responses. For example, request-response pairs can be detected in the data stream. A request-response pair can include a request provided by a client to an application and a corresponding response provided by the application to the client. For instance, the request can be a request for a component of a web page such as an image, a cascaded style sheet, or a JavaScript component.

Decoding module 240 decodes the reconstructed data stream provided by the analysis module when it is an encoded data stream. For example, a data stream may be encoded if it is generated from a stream of packets sent over a secure socket layer connection, e.g., using HTTPS or some other secure protocol. The decoding may be performed using a private key received or otherwise accessed by decoding module 240.

Component ID module 250 receives a reconstructed data stream from analysis module 230 (or decoding module 240 if the stream was encoded), identifies transaction components within the stream such as by identifying name/value pairs and provides the transaction components to a user ID module 260 and a component processing module 270. Further details regarding the component ID module 250 are provided below in connection with FIG. 8.

User identification (ID) module 260 receives the transaction components from component ID module 250 and identifies a session ID and/or user ID from the received components. In some embodiments, a user ID is derived from a login transaction as part of a business transaction. The user identification module 260 then provides the session ID and/or user ID to the statistics and defects monitor 280.

In one approach, a session identifier can be related to one or more transactions. For example, in a web application, the session ID is carried in the observed traffic as a cookie in every packet. The session ID in the packets related to the transaction may be related to the transaction itself. A single session identifier may be bound to one or more transactions. Session attributes, for example, session priority, may also be associated with transactions through this session-to-transaction binding mechanism.

Further, a user identity can be related to transactions. A user ID may be identified and associated with a session by examining and parsing a login transaction for user identity information, for example. In those cases where the login transaction possesses a session identifier, for example, this session ID may be used to establish a relationship between the user ID and the session ID, which may in turn share a relationship with one or more transactions. Another example of user to transaction binding is through the intermediary of a network address, for example where the IP source address of the packets related to the transaction is used to look up user identity in a table of IP address to user identity relationships. User attributes, for example, user priority, user location, user access rights, user organization, and/or user group, among other user attributes may be associated with sessions and/or transactions through this user-to-session binding mechanism and through the user-to-session-to-transaction binding mechanism. User attributes may be retrieved from an external system, for example, by using user identity information to look up user attributes in an X.500 directory, a LDAP directory, and/or a single sign-on system.

Component processing module 270 receives the transaction components from component ID module 250 and processes them to identify associated transactions using transaction definitions received from transaction server 164. A transaction can refer to a series of related network communications that perform a function. For example, the retrieval of a web page may involve one or more transactions. Moreover, a transaction definition may indicate that a particular transaction component is a "primary" component of a particular transaction. In some cases, this can be the first transaction component in a set of transaction components that make up a transaction. The presence of the primary component indicates the presence of the associated transaction. The other transaction components in the definition of a transaction can be considered to be secondary components. For example, if a transaction component within a transaction has a key/value pair indicating an action of "login," then the transaction is a login transaction. The secondary components are also part of the login transaction. The use of primary components to identify transactions can improve efficiency but is not necessary.

The received components are compared to the transaction definitions to identify transactions to be further processed by the traffic monitoring system. Transactions are selected to be processed further if the components conform to one or more of the transaction definitions. In one embodiment, the comparison determines if the received components have a URL which matches a URL in the transaction definitions. The components which match the transaction definitions are combined into transactions and provided to statistics and defects monitor 280 to be processed further. The components that do not match any transaction definitions can be discarded, ignored, identified as "not classified," or otherwise processed.

In addition to identifying transactions based on transaction components, component processing module 270 can identify a business transaction which includes a set of associated transactions. Generally, different logical constructs of a hierarchy can be identified from the transaction components. At higher levels of the hierarchy, a business process which refers to a series of related business transactions, and a domain which refers to a series of related business processes, can be defined using corresponding definitions. A business process can include a set of associated business transactions which have a common session identification, for instance. To illustrate, a business process class for buying a book from an e-commerce web site can be defined. This business process class can include classes of business transactions such as login, shopping, add to cart and checkout. A particular use of the login process, for instance, by a particular user at a particular time represents an example of an instance of the login business transaction. The login business transaction instance may include transaction component instances which provide a user identifier (user ID), a URL for a login page, and a session identifier (session ID). The component processing module provides the identified transactions to the statistics and defects monitor 280.

Further, multiple business process hierarchies may be built on top of a single business transaction/transaction/transaction component hierarchy. Also, users may be part of a user group hierarchy. Users groups may be part of a higher level user group hierarchy. Multiple user group hierarchies may be built on top of the user identification.

Statistics and defects monitor 280 receives session ID data from user ID module 260, identified transactions (transactions that match a transaction definition) from component processing module 270 and defect definitions from transaction server 164. In one embodiment, the defect definitions define criteria for determining whether the behavior of a transaction is acceptable. For example, a defect definition may indicate an acceptable response time for a component, error responses that are allowed or not allowed in response to a request, and other transaction data components required for a transaction. The identified transactions are analyzed based on the defect definitions to generate defects and statistics data. Generally, transactions are defective when they fail to meet quality standards. Moreover, the quality standards may be set for different levels of the hierarchy such as the business transaction, transaction or transaction component levels, for instance. Behavioral defects result from the behavior of a transaction failing to meet specifications. Slow transaction time, fast transaction time, low throughput, and incomplete transactions are examples of different types of behavioral defects. Response defects result from the response of a transaction failing to meet specifications. HTTP response codes (for example, HTTP 500-599 errors), unauthorized access, content analysis defects, and missing response defects are examples of different types of response defects.

The defect data indicates the number of defects found in the identified transactions over time, the type of defect and the number of defect transactions for each particular defect type. The defects may be reported per defective transaction with session identification information. In one embodiment, any identified transactions that conform to the defect definitions are designated as defects. Statistics data may include the number of transactions which occur, the type of transaction (for example, by URL), and other data. The statistics may be reported per hour, per transaction definition, per user and per session identification, for instance. Statistics and defects monitor 280 can report statistics and defect data for the identified transactions to transaction server 164.

Figure 3:
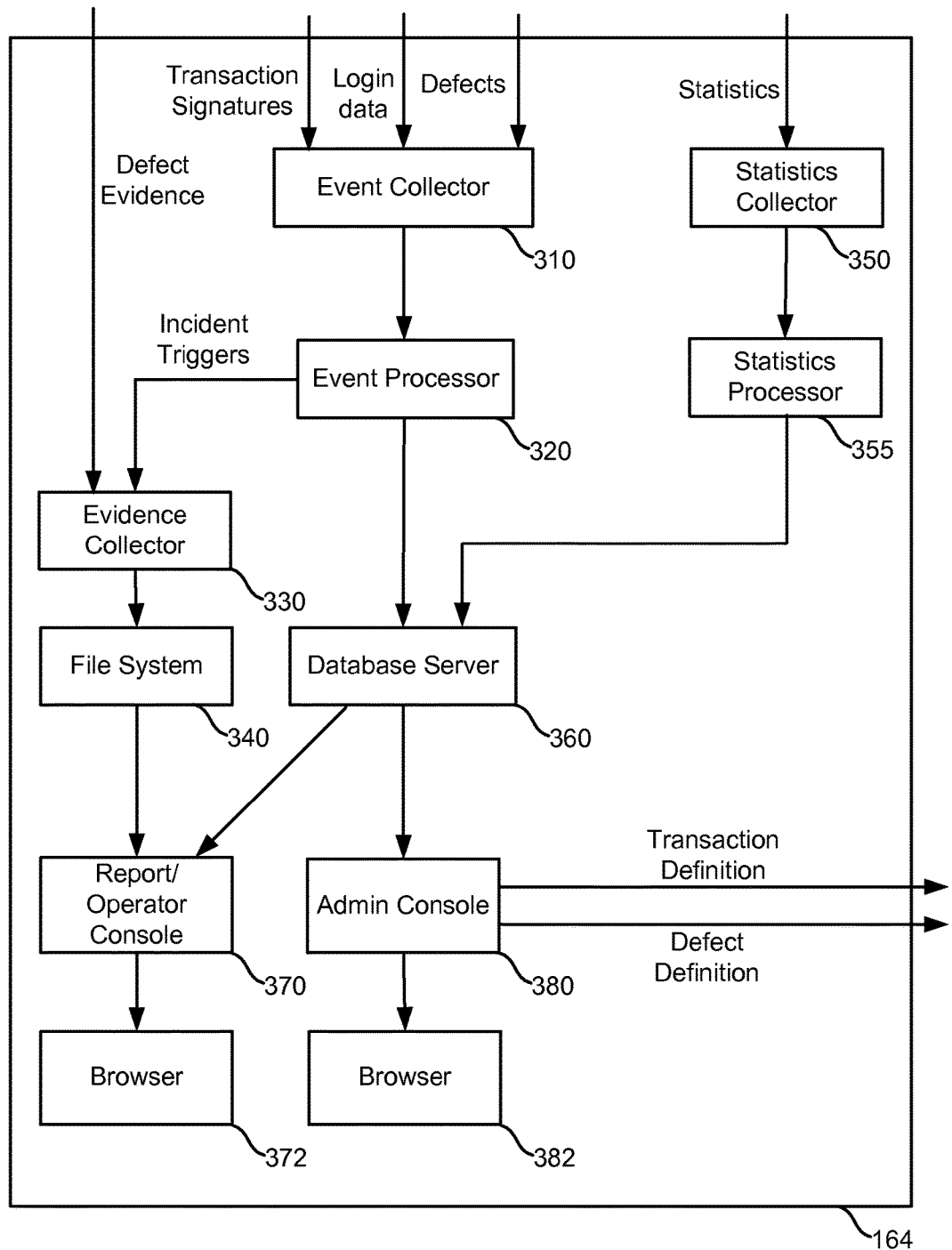
FIG. 3 is a block diagram of an embodiment of a system for receiving traffic information and generating traffic monitoring data.

FIG. 3 is a block diagram of an embodiment of a system for receiving transaction data and generating traffic monitoring data, e.g., transaction statistics, defect data, transaction definitions, and other data. In one embodiment, the system of FIG. 3 provides details regarding software modules for implementing transaction server 164 of FIG. 1D.

Figure 10A:
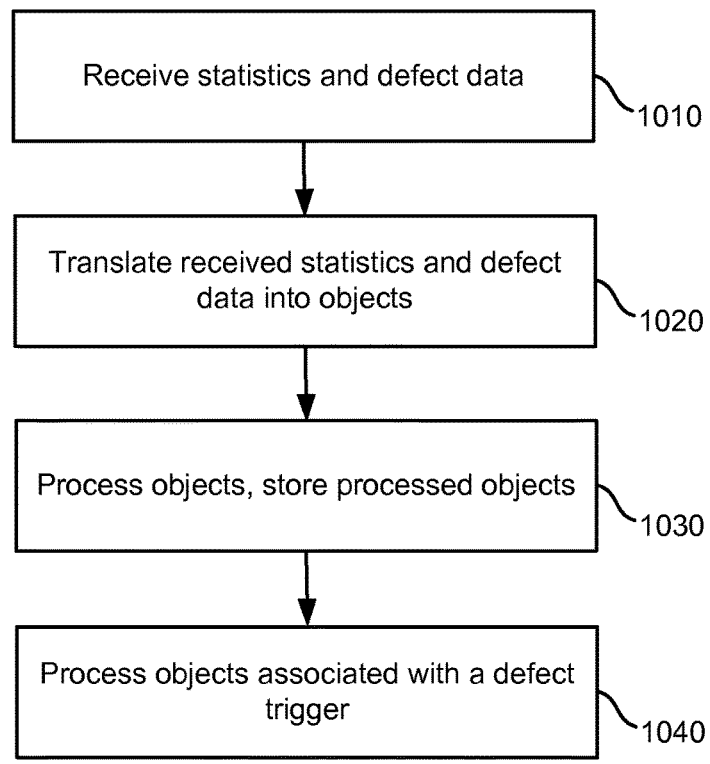
FIG. 10A is a flowchart of an embodiment of a process for performing data collection.
Figure 10B:
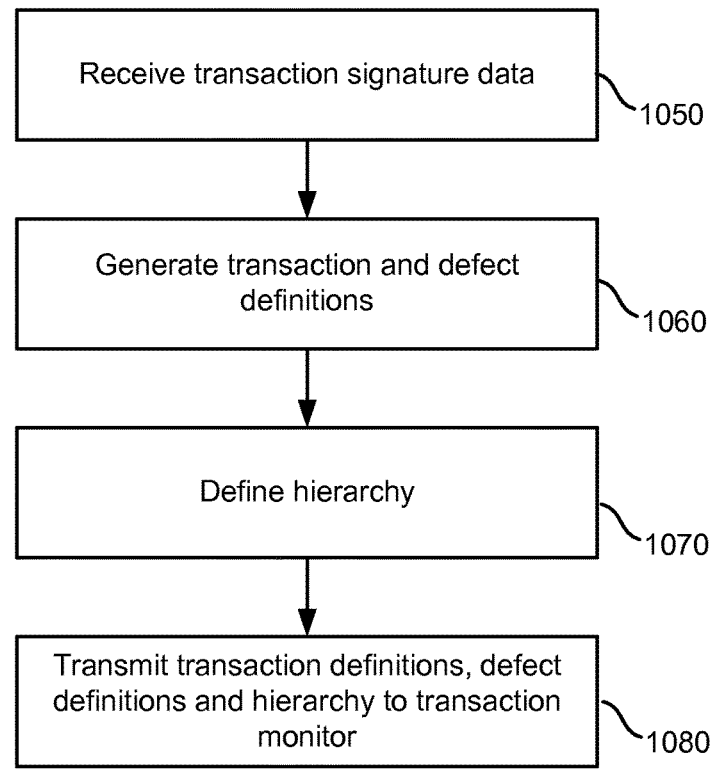
FIG. 10B illustrates a flowchart of an embodiment of a process for generating and transmitting transaction and defect definitions.

Operation of transaction server 164 is discussed with respect to FIGS. 10A and 10B. Generally, transaction server 164 enables an operator to generate traffic classification logic, view traffic monitoring data reports, such as defect and incident reports, and provide transaction and defect definitions to traffic monitor 160.

Event collector 310, statistics collector 350, event processor 320, statistics processor 355, evidence collector 330, file system 340, database server 360, report/operator console 370, admin console 380, and browsers 372 and 382 are provided. Event collector 310 receives data including transaction signatures from recorders 114, 162, and 174 (FIG. 1D) and login data and defects from traffic monitor 160 as discussed above with respect to FIG. 2, and translates the received data into a format that can be processed by event processor 320. In one embodiment, event collector 310 generates objects, such as Java objects, from the received data and provides the objects to event processor 320. Event processor 320 processes the objects to provide database data to be stored at database server 360. In some embodiments, database server 360 may be implemented as an SQL database server. In one possible approach, the Java Database Connectivity (JDBC) API can be used for this purpose. JDBC enables Java programs to execute SQL statements to allow Java programs to interact with an SQL-compliant database.

Similarly, statistics collector 350 receives statistics data from traffic monitor 160, translates the received data into one or more objects, such as Java objects, and provides the generated objects to statistics processor 355. Statistics processor 355 processes the objects to provide database data to be stored at database server 360, again such as by using JDBC.

Event processor 320 may also generate incident triggers for use by evidence collector 330. An incident can be set when one or more related defects are set. An incident may be a cause for concern which should be analyzed further. An incident trigger is an event that informs evidence collector 330 when to collect evidence associated with defects. The one or more defects of an incident can be associated when they are caused by the same factors, for instance. For example, an incident may be associated with a group of one or more defects having the same defect type, or affecting the same business transaction or group of users. In some cases, a defect such as a slow response to a request may not be sufficient to set an incident, but a specified number of such defects may be sufficient. In other cases, a single occurrence of a type of defect may set an incident. In response to receipt of incident triggers, evidence collector 330 gathers evidence regarding defects and/or incidents and provides the evidence to file system 340. The evidence gathered can be any form of unstructured data collected from various resources (e.g., switches, routers, load balancers, web servers, application servers, database servers, etc.) Evidence collector 330 places gathered evidence into persistent storage. For example, in one possible approach, the evidence is placed in an evidence file (for example, in HTML format) and stored at the file system 340. For example, when a number of "slow transaction" defects trigger the business impact threshold of an incident, an evidence collection trigger can be sent from event processor 320 to evidence collector 330. Evidence collector 330 can execute any executable program, including scripts, to collect any form of evidence, for example, a script (Unix shell, Python, Perl, etc.) to retrieve a web log from the server performing the slow transaction and execute a Simple Network Management Protocol (SNMP) GET command on a router. The script then appends the content of the web log and the results of the SNMP query into a single evidence file. In some cases, the script may also reformat the content of the evidence file in a format for providing a display in a web browser such as by inserting various HTML tags into the evidence file.

A persistent store such as database server 360 may store transaction data and other data, e.g., based on data received from processors 320 and 355, for access by an operator user through operator console 370 and admin console 380 of transaction server 164. Note that the admin console 380 and the operator console can optionally be provided in the same console. Operator console 370 may be used to access and perform operations on data at the database server 360. Admin console 380 may provide an interface through browser 382 to allow an operator to view reports, define transaction and defect definitions from received transaction signatures and perform other tasks. Defining a transaction definition and defect definition is discussed in more detail below.

Figure 4:
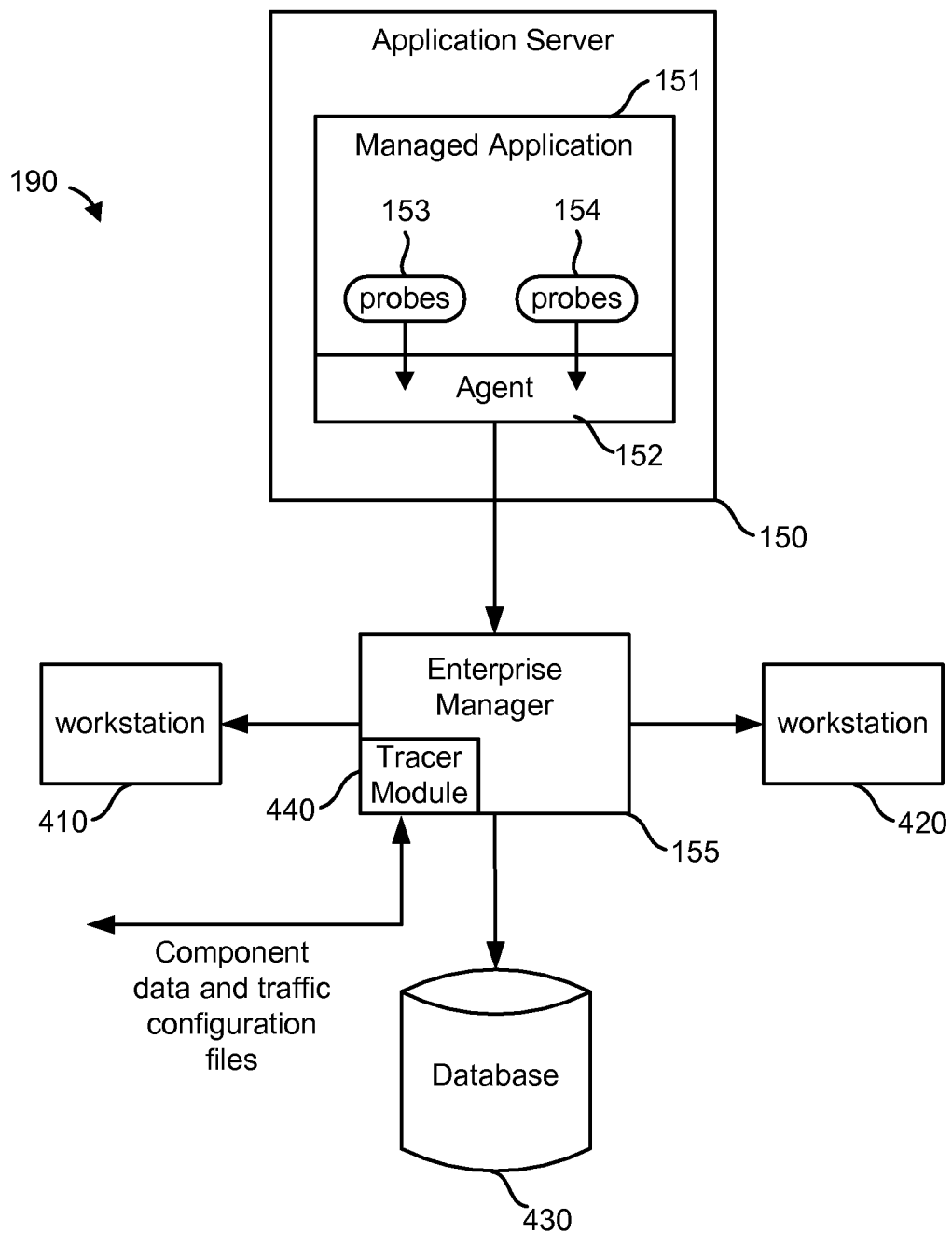
FIG. 4 is a block diagram of an embodiment of a system for monitoring an application.

FIG. 4 is a block diagram of an embodiment of a system for monitoring an application. As discussed above with respect to FIG. 1A, the application monitoring system 190 may be used to monitor an application and generate application runtime data. In one embodiment, FIG. 4 provides more detail for application server 150 and Enterprise Manager 155 of FIG. 1D. The system includes application server 150 which is in communication with Enterprise Manager 155 which, in turn, is in communication with example workstations 410 and 420 and database 430. Application server 150 includes managed application 151, which includes agent 152 and example probes 153 and 154. Application 151 can be a Java application or a different type of application.

Behavior of the application 151 can be monitored by instrumenting bytecode or intermediate language (IL) code of the application, by plugging into an exit built into the application or network server, or by any other monitoring technique. For example, information from the application 151 can also be obtained using probes 153 and 154. In practice, many such probes can be used to obtain information regarding different components of the application.

In one embodiment, a probe builder (not pictured) instruments (e.g. modifies) bytecode for application 151 to add the probes 153 and 154 and additional code. In another approach, developers add probes to the application source code. The probes may measure specific pieces of information regarding the application without changing the application's business logic. The probe builder may also add agent 152 which may be installed on the same machine as application 151 or a separate machine. Once the probes have been installed in the application, or a monitoring capability has otherwise been provided, the application is referred to as a managed application. More information about instrumenting bytecode can be found in U.S. Pat. No. 6,260,187, "System For Modifying Object Oriented Code" by Lewis K. Cirne, and U.S. patent application Ser. No. 09/795,901, "Adding Functionality To Existing Code At Exits," filed on Feb. 28, 2001, each of which is incorporated herein by reference in its entirety. See also FIG. 11.

As managed application 151 runs, probes 153 and 154 send data to agent 152. In one embodiment, probes 153 and 154 may be implemented in objects and other code that write data, change data or otherwise cause the state of an application server to change. Agent 152 then collects, summarizes and sends the data, referred to as application runtime data, to Enterprise Manager 155. In response, Enterprise Manager 155 runs requested calculations, makes application runtime data available to workstations 230 and 240 and, optionally, sends the application runtime data to database 430 for later analysis. More information regarding monitoring an application using probes can be found in U.S. Patent App. Pub. No. 2004/0075690, published Apr. 22, 2004, titled, "User Interface For Viewing Performance Information About Transactions", by Lewis K. Cirne, incorporated herein by reference.

Workstations 410 and 420 provide a graphical interface for viewing application runtime data such as by creating custom views which can be monitored by a human operator. The workstations can include windows which provide a set of customizable views and depict alerts and calculators that filter application runtime data so that the data can be viewed in a meaningful way. The elements of the workstation that organize, manipulate, filter and display application runtime data can include actions, alerts, calculators, dashboards, persistent collections, metric groupings, comparisons, smart triggers and SNMP collections.

In one embodiment of the system of FIG. 4, one or more components are running on different computing devices. Alternatively, the components can run on the same computing device. A computing device on which each component may run is discussed in more detail below with respect to FIG. 5.

Enterprise manager 155 may also include tracer module 440 which may receive a hierarchy rules engine from transaction server 164 of FIG. 1D. In another approach, the tracer module 440 receives a configuration file which it parses to obtain the rules engine. In either case, the rules engine can be used to classify the application performance data according to different levels of the hierarchy. In one embodiment, the configuration file may include transaction server module identification, the date and time that the configuration file was created, application defect information, parameter defect lists and information regarding a domain, business processes associated with the domain, business transactions associated with the business processes, transactions associated with the business transactions and transaction components for each transaction. Further, for each of the business transactions, transactions and transaction components, defect definitions may be specified. Processing using a hierarchy is discussed in more detail below.

Figure 5:
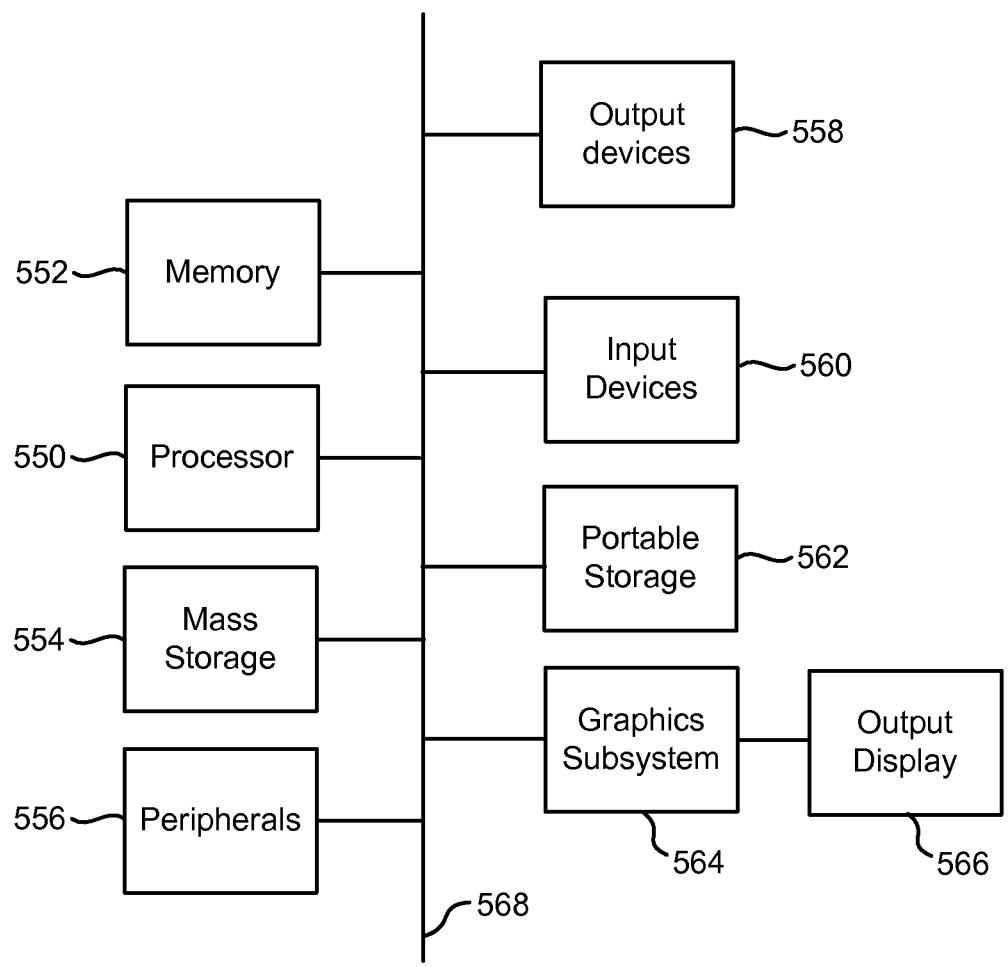
FIG. 5 is a block diagram of an embodiment of a computing system.

FIG. 5 is a block diagram of an embodiment of a computing system for use with the present technology. In one embodiment, the computing system may be used to implement client device 110, any of firewall 132, router 134 and switch 136 on one or more machines, network server 140, application server 150, database server 151, Enterprise Manager 150, workstations 410 and 420, database 430, traffic monitor 160, transaction server 164, synthetic transaction generator 172, script recorder 174 and synthetic transaction script module 170.

The computer system includes one or more processors 550 and main memory 552 which stores, in part, instructions and data for execution by processor unit 550. If the system of the present invention is wholly or partially implemented in software, main memory 552 can store the executable code when in operation. Also provided are a mass storage device 554, peripheral device(s) 556, user input device(s) 560, output devices 558, portable storage medium drive(s) 562, a graphics subsystem 564 and an output display 566. For simplicity, the components are depicted as being connected via a single bus 568. However, the components may be connected through one or more data transport means. For example, processor unit 550 and main memory 552 may be connected via a local microprocessor bus, and the mass storage device 554, peripheral device(s) 556, portable storage medium drive(s) 562, and graphics subsystem 564 may be connected via one or more input/output (I/O) buses. Mass storage device 554, which may be implemented with a magnetic disk drive or an optical disk drive, is a non-volatile storage device for storing data and instructions for use by processor unit 550. In one embodiment, mass storage device 554 stores the system software for implementing the present invention for purposes of loading to main memory 552.

Portable storage medium drive 562 operates with a portable non-volatile storage medium, such as a floppy disk, to input and output data and code to and from the computer system. In one embodiment, the system software for implementing the present invention is stored on such a portable medium, and is input to the computer system via the portable storage medium drive 562. Peripheral device(s) 556 may include any type of computer support device, such as an input/output (I/O) interface, to add additional functionality to the computer system. For example, peripheral device(s) 556 may include a network interface for connecting the computer system to a network, a modem, a router, etc.

User input device(s) 560 provides a portion of a user interface. User input device(s) 560 may include an alpha-numeric keypad for inputting alpha-numeric and other information, or a pointing device, such as a mouse, a trackball, stylus, or cursor direction keys. In order to display textual and graphical information, the computer system includes graphics subsystem 564 and output display 566. Output display 566 may include a cathode ray tube (CRT) display, liquid crystal display (LCD) or other suitable display device. Graphics subsystem 564 receives textual and graphical information, and processes the information for output to output display 566. Additionally, the computer system includes output devices 558. Examples of suitable output devices include speakers, printers, network interfaces, monitors, etc.

The components contained in the computer system are those typically found in computer systems suitable for use with the present invention, and are intended to represent a broad category of such computer components that are well known in the art. Thus, the computer system can be a personal computer, hand held computing device, telephone, mobile computing device, workstation, server, minicomputer, mainframe computer, or any other computing device. The computer system can also include different bus configurations, networked platforms, multi-processor platforms, etc. Various operating systems can be used including Unix, Linux, Windows, Macintosh OS, Palm OS, and other suitable operating systems.

Figure 6:
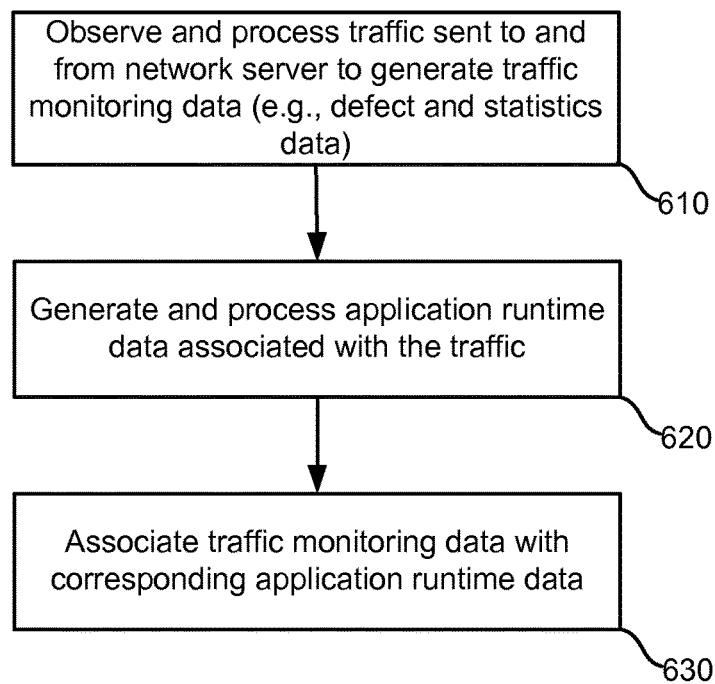
FIG. 6 is a flowchart of an embodiment of a process for monitoring a network service.

FIG. 6 is a flowchart of an embodiment of a process for monitoring a network service. The process can be performed by traffic monitoring system 180 and application monitoring system 190 of FIG. 1. The process begins with the traffic monitoring system observing and processing traffic sent to and from network server 140 to generate traffic monitoring data such as defects and statistics data, at step 610. In one embodiment, traffic may be received by a device in the line of communication between client 110 and network server 140. The device which receives the traffic sends a copy of the traffic to traffic monitoring system 180 while also forwarding the traffic to its intended destination. In particular, the traffic is received and processed by traffic monitor 160 and further processed by transaction server 164 of FIG. 1, e.g., to translate the traffic into transaction components, identify transactions from the transaction components, obtain statistics and defect data from the identified transactions, store transaction data and report information regarding the stored transaction data. Observing and processing traffic in step 610 is discussed in more detail below with respect to FIG. 7.

Application runtime data associated with the observed traffic is generated and processed by the application monitoring system at step 620. For example, the application may execute to handle a request from a network server to retrieve data from a database by sending a request to the database for the requested data, receiving the data in a response from the database, and sending the requested data to the network server in a response. For each of these actions performed by the application while processing the request, application runtime data can be generated, e.g., by the agent 152, and sent to Enterprise Manager 155 for processing. Step 620 is discussed in more detail below with respect to FIG. 11.

Traffic monitoring data can be associated with corresponding application runtime data at step 630. This can be achieved in different ways. For example, an identifier may be assigned by the application monitoring system to a request-response pair of a transaction component and provided to the traffic monitoring system in the response. Moreover, in some embodiments, the traffic monitoring system and the application monitoring system may use the same or similar classification rules for classifying transactions according to a hierarchy. In some embodiments, traffic monitoring data may be integrated with the application runtime data and viewed through an output device. Providing application runtime data associated with traffic monitoring data to an operator is discussed in more detail below, e.g., with respect to FIGS. 12A-13.

Figure 7:
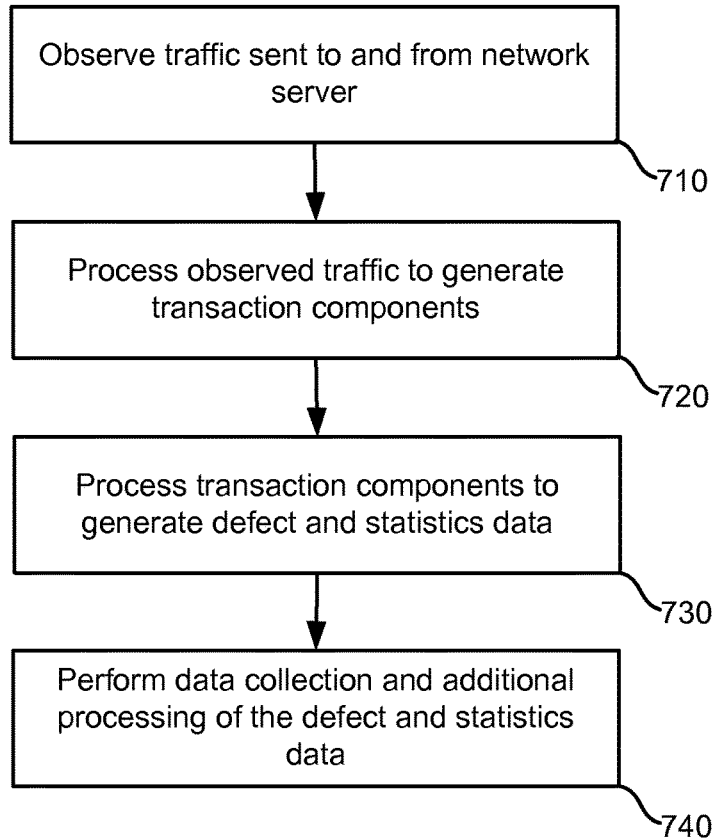
FIG. 7 is a flowchart of an embodiment of a process for observing and processing network server traffic.

FIG. 7 is a flowchart of an embodiment of a process for capturing and processing network service system traffic. In one embodiment, the flowchart provides more detail for step 610 of FIG. 6 performed by traffic monitoring system 180. First, traffic sent to and from network server 140 is observed at step 710, e.g., by receiving the traffic at router 134, switch 136 or some other point between firewall 132 and network server 140. The device which receives the traffic can provide a copy of the traffic to traffic monitoring system 180, enabling system 180 to observe the traffic. In another approach, observing the traffic can include intercepting the traffic and forwarding it to its intended destination.

The traffic monitor 160 processes the observed traffic to generate transaction components at step 720. Referring also to the discussion regarding FIG. 2, this processing may include constructing a data stream from data packets of the observed traffic, determining request-response pairs that form transaction components, and grouping the transaction components into classifications such as transactions, business transactions, business processes and a domain. This processing is discussed in more detail below with respect to FIG. 8.

Traffic monitor 160 processes the transaction components to generate defect and statistics data at step 730. In one embodiment, this involves processing transaction components to identify valid transactions using received transaction definitions, determining defect and statistics data from the valid transactions and defect definitions, and providing the defect and statistics data for further processing, storage and reporting. This processing is discussed in more detail below with respect to FIG. 9.

Transaction server 164 performs data collection and additional processing on the defects and statistics data at step 740. In one embodiment, data collection includes translating the defects and statistics data into a format which can be stored in a database, storing the data and reporting the data. The additional processing may include generating transaction and defect definitions from transaction signature data received from one or more recorders and providing the definitions to traffic monitor 160. Performing data collection and additional processing is discussed in more detail below with respect to FIG. 10A.

Figure 8:
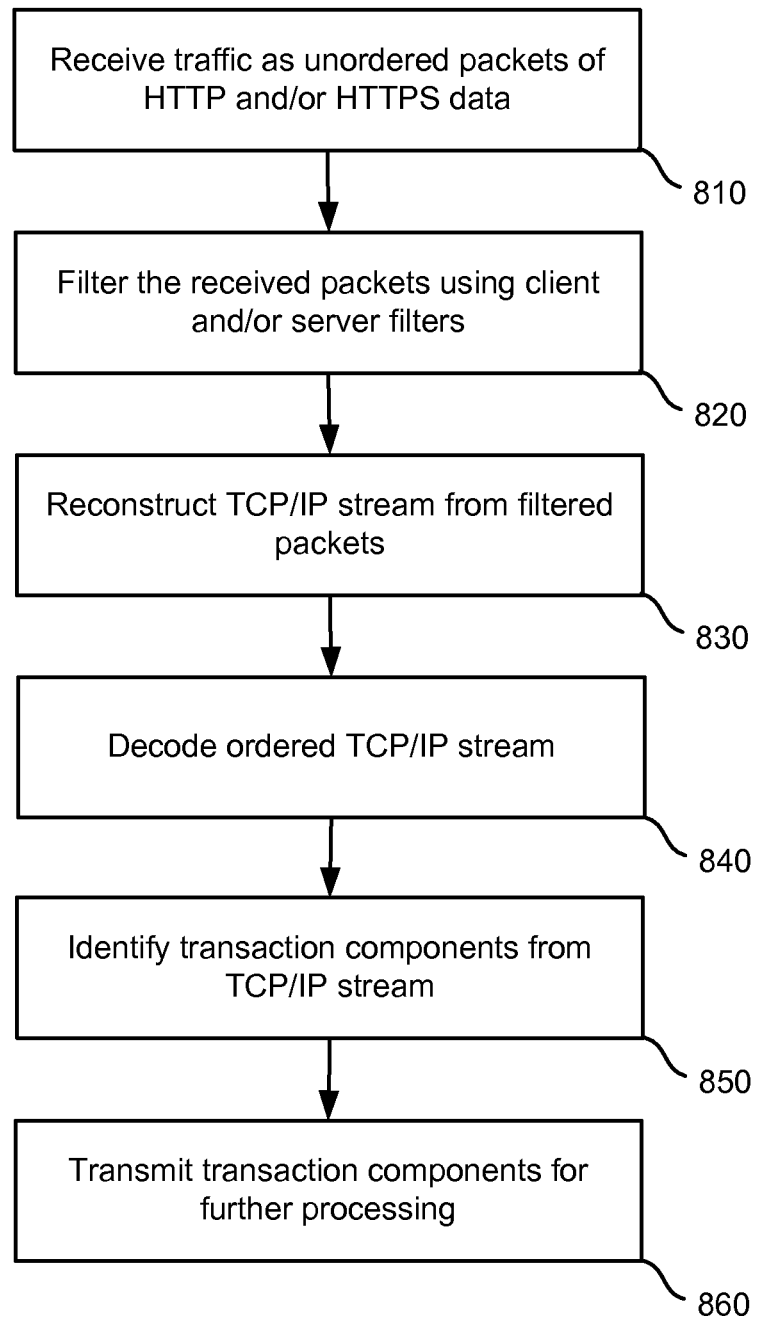
FIG. 8 is a flowchart of an embodiment of a process for obtaining transaction components from observed traffic.

FIG. 8 is a flowchart of an embodiment of a process for obtaining transaction components from observed traffic. In one embodiment, the process provides more detail for step 720 of the process of FIG. 7 and can be implemented by modules 210-250 of transaction server 160 of FIG. 2. At step 810, traffic is received, e.g., in the form of unordered packets of data provided in an HTTP and/or HTTPS format or some other network data transport format.

The unordered packets are filtered at step 820, e.g., via packet processing module 210 using filter data received from the transaction server 164. The filter data can apply to the client 110, network server 140 and/or application server 150. In one embodiment, the filtering achieves load-balancing of large packet streams across multiple traffic monitors. For example, if three traffic monitors process a large packet stream, each traffic monitor may be configured to process one third of the stream. The traffic monitors may be configured by a client or server filter file that instructs each monitor as to what range of traffic to process. The packet filtering can involve determining which traffic should be captured and processed and which packets should be discarded or ignored or otherwise processed differently.

Filtering may be performed based on client and/or server filters received by traffic monitor 160. The client and server filters may include one or more IP address ranges, for instance, which indicate which packets to process and/or which packets not to process for a particular traffic monitor. Thus, if an observed traffic packet has an IP address which is not within a corresponding IP address range of a corresponding filter, the traffic packet is not processed. The client filter file may enable filtering based on client IP address ranges. A server filter file may enable filtering on server IP address ranges. Filtering can also be based on IP-Address:TCP-Port combinations in addition to just IP-Address, or any other form of filtering. If no filter file is received and no client filters are specified for a traffic monitor module, the particular traffic monitor does not perform client filtering of incoming traffic packets. When one or more client filters are specified, any captured packet that does not match at least one of the client filters can be discarded. For example, a packet matches a filter if either its source or destination address is greater than or equal to the <FromIp> address of a client filter and less than or equal to the <ToIp> address of the same filter. In some embodiments, the packet source and/or destination address, client filter <FromIp> address and client filter <ToIp> address are 32-bit numbers.

After filtering the packets, a TCP/IP stream, for instance, is reconstructed from the filtered packets at step 830. The TCP/IP stream can be generated by analysis module 230 of traffic monitor 160 of FIG. 2 such as by generating requests and responses in a network protocol format (e.g., for HTTP format, the requests and responses have a header and data portion) from the received traffic packets. The generated TCP/IP stream is then decoded, if necessary, at step 840 by decoding module 240 of traffic monitor 160 (FIG. 2). In one embodiment, decoding module 240 decodes an encrypted ordered TCP/IP stream using a private key which is obtained from network server 140 or other source by traffic monitor 160 to provide a decoded TCP/IP stream to component ID module 250.

After decoding the stream, transaction components are identified from the TCP/IP stream at step 850 by component ID module 250. As discussed above, a transaction component can include a portion of a content page provided as a response to a request. In this case, component ID module 250 parses requests in the decoded TCP/IP stream to generate transaction components. For example, each request may be parsed to determine query, cookie, post, URL and session type name/value pairs. For example, a typical HTTP post request which can be parsed by traffic monitor 160 is shown below.

```
Request-line: POST /dir/file.html?query1=q1&query2=q2 HTTP/1.1\r\n
request-headers: Content-type: application/x-www-form-urlencoded\r\n
    Host: www.company.com\r\n
    Cookie: cookie1=c1; cookie2=c2\r\n
    Referer: https://www.company.com/dir/home.html?action=login\r\n
    \r\n
request-body: post1=p1&post2=p2
```

An example of an HTTP parameter list derived from parsing the above request is shown below. Each parameter includes a type and name/value pair.

```
type="Query," name="query1", value="q1"
type="Query," name="query2", value="q2"
type="Cookie," name="cookie1", value="c1"
type="Cookie," name="cookie2", value="c2"
type="Post," name="post1", value="p1"
type="Post," name="post2", value="p2"
type="Url," name="Host", value="www.company.com"
type="Url," name="Path", value="/dir/file.html"
type="Url,"
name="Url",value=
"www.company.com/dir/file.html?query1=q1&query=q2"
type="Url,"
name="Referer",value="www.company.com/dir/home.html?action=login"
```

The parameter list data is retrieved from the request listed above. In particular, the parameter list query data can be retrieved from the request-line of the request, the cookie data can be retrieved from the request headers, the post data can be retrieved from the request body, and the URL data can be retrieved from the request header and request line.

Identifying components at step 850 may include identifying primary and secondary components. As discussed above, a request can be processed to identify transaction components by comparing parameters in the request to parameters in a transaction definition. If the request includes a primary transaction component, the request can be categorized directly according to the transaction with which the primary transaction component is associated. A primary transaction component and associated secondary components can be identified by their use of the same session ID in one possible approach. In some embodiments, a primary component may be identified as the first component to have a particular session ID. In some embodiments, a primary component is a component having a "content type" value that starts with "text." If no primary transaction component is used, the request can be categorized according to a transaction definition which is met by a set of one or more transaction components of the request. Further, the request-response pair can be categorized according to the request, in one possible approach. The transaction components are transmitted by component ID module 250 to user ID module 260 and component processing module 270 of traffic monitor 160 for further processing at step 860.

Figure 9:
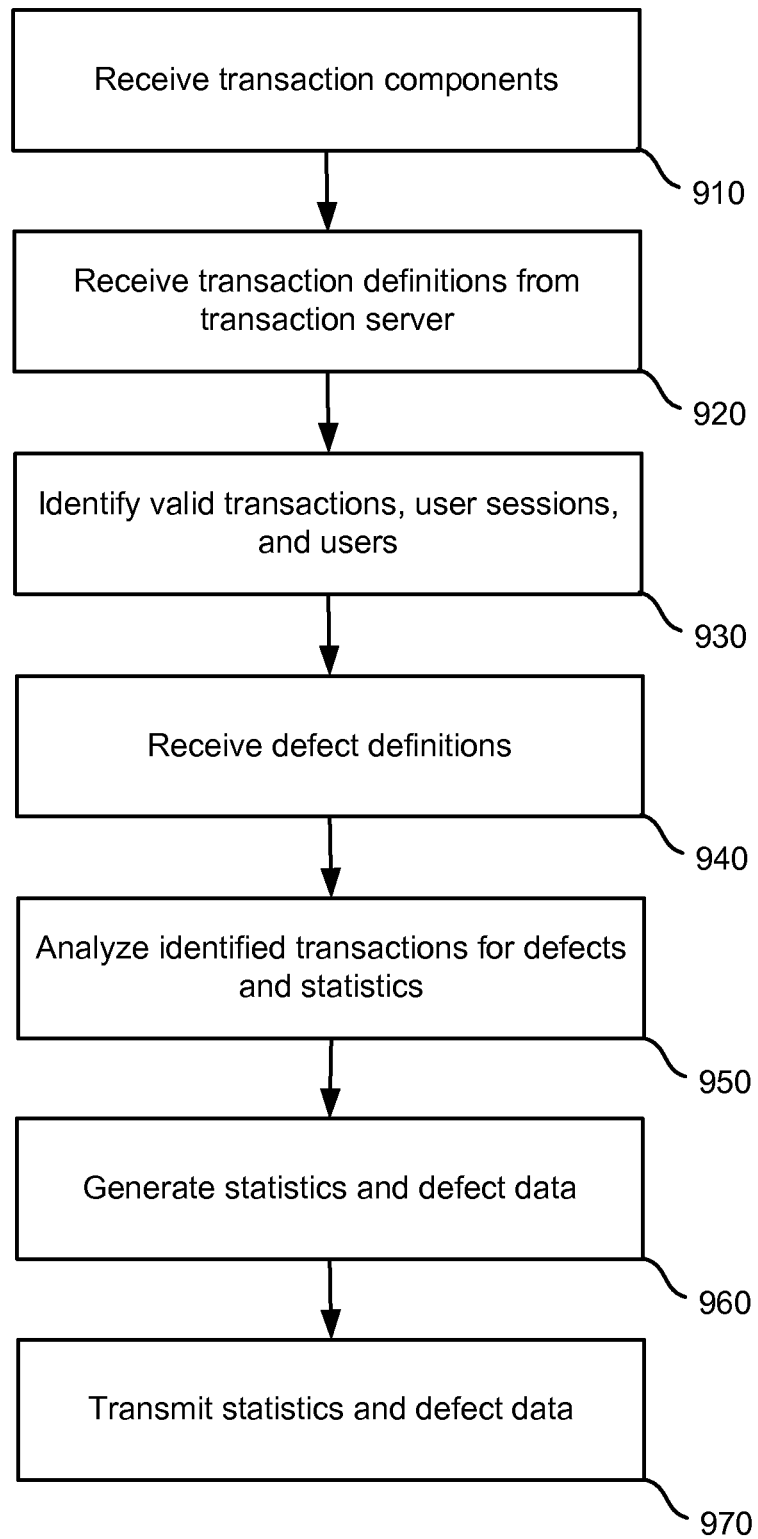
FIG. 9 is a flowchart of an embodiment of a process for processing transaction components from observed traffic.

FIG. 9 is a flowchart of an embodiment of a process for processing transaction components. In one embodiment, the flowchart of FIG. 9 provides more detail for step 730 of FIG.

7 and is implemented by modules 260-280 of traffic monitor 160 of FIG. 2. First, transaction components are received at step 910, e.g., including primary components and secondary components.

Transaction definitions are received by module 270 from transaction server 164 at step 920. The transaction definitions are generated by transaction server 164 from user input and/or transaction signatures received by transaction server 164 to describe templates that the traffic monitoring system should use in detecting patterns in the traffic. In one embodiment, recorders capture transaction data, generate transaction signatures from the transaction data and provide the signatures to transaction server 164. An operator may view the transaction signatures, modify them if desired, and select them to become transaction definitions. The transaction definitions may include HTTP parameter definitions, for instance, such as type, name and specification parameters. The type contained in the HTTP parameter definitions may include a query, cookie post, URL or session manager type. An HTTP parameter definition of a transaction name may be "user login" or any other name provided by an operator. The specification parameters may indicate a URL associated with the transaction, user identification, client machine identification, server machine identification, and other parameters associated with the particular transaction. Generation of transaction definitions from transaction signatures is discussed in more detail below with respect to steps 1050-1060 of FIG. 10B.

After receiving transaction definitions, traffic monitor 160 identifies valid transactions, user sessions and users at step 930. In one embodiment, a user name associated with a user session is detected by user ID module 260. The user name may include a login name for a user and can be included in the first request-response pair associated with a session. Once the login name or user name is identified, the login name and corresponding session ID (included in every request and response pair) is forwarded as login data to transaction server 164. User ID module 260 then forwards the session identification data to statistics and defects monitor 280.

Component processing module 270 identifies valid transactions by comparing the transaction definitions to the transaction components. In some embodiments, component processing module 270 may compare a URL of a transaction component with the transaction definitions. In some embodiments, component processing module 270 may also compare user identification, client machine identification, and other information of the transaction components to the transaction definitions. If the data contained in the transactions components does not match any transaction definition, the transaction component can be discarded, ignored, identified as "unclassified" or otherwise processed.

Defect definitions are received from transaction server 164 by traffic monitor 160 at step 940. At step 950, identified transactions are monitored for defects and statistics. Step 950 may be performed by statistics and defects monitor 280 of the system of FIG. 2. For example, valid transactions can be compared to the defect definitions to determine if any of the transactions are defective. Defect definitions may specify what comprises a defect and/or an acceptable transaction. In any case, transactions identified as defective are identified at step 950. For example, the defect definitions may specify that a transaction having a particular URL should not have a response time over a particular response time threshold. Thus, for all transactions having the particular URL and having a response time over the response time threshold, the transaction is identified as defective. A defective transaction is a transaction with one or more defects.

Statistics and defect data are then generated from the identified transactions at step 960 by statistics and defects monitor 280. Statistics may include, e.g., response time, count of completed transactions, count of uncompleted transactions, and other statistics for one or more transactions. Defect data may include defect and incident information, count information such as the number of times a particular defect has occurred and other data associated with transactions identified as being defective. The statistics and defect data is transmitted to transaction server 164 at step 970. In some embodiments, the defect data may be in XML format and the statistics data may be in binary format.

FIG. 10A illustrates a flowchart of an embodiment of a process for performing data collection. In one embodiment, the flowchart provides more detail for step 740 of the flowchart of FIG. 7 and is performed by transaction server 164. At step 1010, statistics and defect data are received by transaction server 164 from traffic monitor 160. In one embodiment, the statistics data is provided for one or more transactions based on the transaction URL. In some embodiments, the defects and statistics may be received by event collector 130 and statistics collector 350, respectively (FIG. 3).

The statistics and defect data are translated into a persistent storage state and stored, e.g., in an SQL database. In this embodiment, the statistics and defect data are first translated into objects such as Java objects at step 1020. The translation may be performed by collectors 310 and 350, as illustrated in FIG. 3. Statistics collector 350 receives statistics data, e.g., in a binary format, from traffic monitor 160, translates the received data into objects and provides the objects to statistics processor 355.

The objects are processed and stored at step 1030 by event processor 320. In one embodiment, storing the objects includes retrieving login data from the objects and storing the login data as a session ID and user name pair.

Next, the objects associated with a defect trigger are processed at step 1040. In some embodiments, the objects are processed to determine whether a defect is new or matches pre-existing defect criteria. In this embodiment, if a defect does not match pre-existing defect criteria, a new defect is created. Handling of triggers and the corresponding gathering of evidence is discussed in more detail above.

FIG. 10B illustrates a flowchart of an embodiment of a process for generating and transmitting transaction and defect definitions. In one embodiment, the flowchart provides more detail for step 740 of the flowchart of FIG. 7. As discussed above, a transaction signature describes an individual transaction that is captured by a recorder. A received transaction signature may later be manipulated into a transaction definition through transaction server 164 and used by traffic monitor 160 to identify valid transactions. Transaction signature data may be received by event collector 310 from one or more recorders, such as recorders 114, 162 and 174 of FIG. 1D and translated into objects before being stored in database server 360 (FIG. 3).

After receiving the transaction signature data, transaction definitions and defect definitions can be generated at step 1060. In one embodiment, admin console 380 provides an interface through browser 382 (FIG. 3) for this purpose. In particular, the operator may manipulate the transaction signature data and enter other commands through the interface to generate the transaction and defect definitions. This provides a convenient method for generating transaction definitions without having to generate them from scratch, although it is also possible for the operator to provide one or more transaction definitions from scratch. Rather, transactions can be recorded from actual client-application interactions, data for the transactions can be provided to an operator as a transaction signature for a particular transaction, and the operator may modify, e.g., edit, the signature through the interface.

For example, admin console 380 may present transaction signature data for a login transaction signature which includes parameters indicating that a login transaction request was received from a particular client machine A by a particular front-end web server B, that the request from client machine A included a specific user name parameter and password parameter, and that the request took twenty milliseconds to complete. An operator may manipulate the transaction signature into a transaction definition by changing the parameters, e.g., to identify a transaction from any client machine (rather than only client machine A). This can be done by deleting an identifier in the transaction signature associated with client machine A, for instance. A wildcard character can also be used to specify, e.g., a subset of a group of machines which are to be included in a transaction definition. The transaction signature can similarly be modified to omit a reference to any specific user name and password parameters and to specify a response time no greater than fifty milliseconds, for instance, (rather than exactly twenty milliseconds). In this case, the transaction definition is made more general and inclusive than the original transaction signature. A balance should be struck in modifying transaction definitions to avoid over- or under-inclusiveness. The operator can thus modify a transaction signature and select or "promote" the transaction signature to a transaction definition for transactions of interest.

For example, assume the operator is interested in monitoring a login process which involves one or more web pages which allow a user to login to a web site. The trained operator can recognize such web pages by their URLs. Requests with URLs for those web pages may therefore be generalized and promoted to transaction definitions. Moreover, a request with a URL for a login web page will typically include an identifier of the particular user in a query field of the URL, e.g., after the "?" in the URL. This user-specific information would result in an unnecessarily narrow transaction definition because only login requests from that specific user would match. Accordingly, the URL can be edited to delete the user-specific information, thereby generalizing the transaction definition so that login requests from all users will match the transaction definition.

In some embodiments, a signature parameter of a response time threshold may be used to identify defective transactions. For example, a transaction signature may be modified and saved as a defect definition so that transaction signatures which match the defect definition indicate a defective transaction. In another approach, a transaction signature may be modified and saved to define a non-defective transaction so that transaction signatures which match the non-defect definition indicated a non-defective transaction. In any case, the modified transaction signature may then be saved as a transaction definition. Additionally, generating a transaction or defect definition may include defining a business transaction, a domain, an application and user identifiers, business processes associated with an application, and other information. An application may be an attribute of a business process and include a session ID, user ID and other information.

Thus, admin console 380 may access the stored transaction signature data, provide it through an interface to be edited by an operator, and store the resulting transaction and/or defect definitions at database server 360. In other embodiments, an operator may manually generate transaction and defect definitions and store them in database server 360.

At step 1070, the operator can define a hierarchy. For example, a domain level can be defined at the top of the hierarchy followed by one or more business processes and business transactions associated with the business processes, where the detected transactions in the traffic can be associated with the business transactions. See also the discussions associated with step 102 of FIG. 1B and the component processing module 270 of FIG. 2. A hierarchy rules engine can be generated based on the transaction and hierarchy definitions for use in classifying interactions with an application.

After generating transaction definitions, defect definitions and a hierarchy, they are transmitted to traffic monitor 160 at step 1080 for use in monitoring incoming traffic, identifying transactions to process and classifying the transactions according to the hierarchy.

Figure 11:
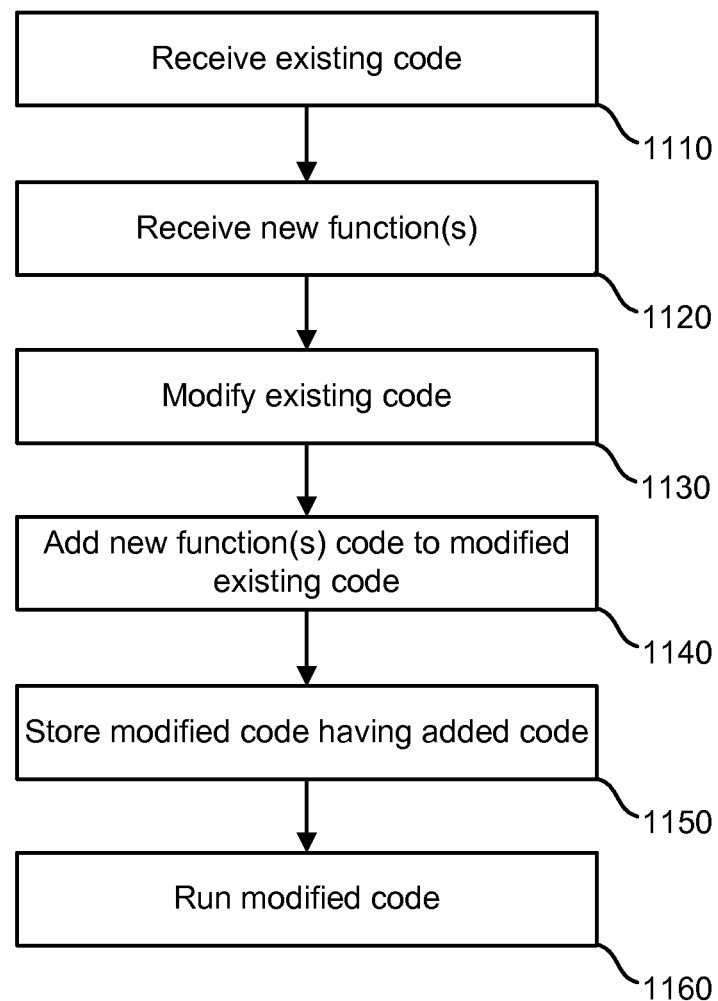
FIG. 11 is a flowchart of an embodiment of a process for modifying application code to generate application runtime data.

FIG. 11 is a flowchart of an embodiment of a process for modifying application code to generate application runtime data. As discussed in connection with FIG. 4, application monitoring system 190 monitors one or more applications, such as application 151 of application server 150, and generates application runtime data from the monitored applications. To achieve this, application code is configured to generate and provide application runtime data which is associated with processing of requests. Put another way, the flowchart of FIG. 11 is one embodiment of a process of modifying the existing object code of an application in order to monitor the application. In step 1110, a probe builder or other module receives the existing object code. In step 1120, the probe builder receives the new functionality, which can be new classes and processes that allow for monitoring of the application. In some embodiments, the new classes and processes can be provided by one or more libraries.

The existing code is modified to prepare for additional code at step 1130. In some embodiments, the existing code is modified to account for the size of the additional code, e.g., by adjusting indices for the existing code. Instructions of the existing code which follow an insertion point of the additional code are moved to make room for instructions of the additional code. For example, if the new code consumes eight bytes, then the indices for the existing code are adjusted to reflect a displacement of eight bytes. Additionally, all references to bytecode within an instruction, e.g., a pointer reference for a jump or branch instruction, may be adjusted.

All or part of the new functionality (e.g., the new classes/methods) is added to, combined with, or otherwise associated with the existing modified code at step 1140. Note that instrumenting bytecode of an application is only one example of a technique for monitoring an application. Various other techniques can be used, such as plugging into an exit built into the application or network server. In one embodiment, step 1140 may include adding a function which writes application data, such as a request-response pair identifier, an application server IP address and other information, to a response header generated by application code, as discussed in more detail below with respect to step 1220 of the flowchart of FIG. 12A. The application data may be observed and processed as network server traffic by traffic monitor 160 as the response travels from application server 150 to network server 140 and to client device 110. The modified code which includes the added code is stored at step 1150. In step 1160, the modified code is run, thereby generating application runtime data.

Figure 12A:
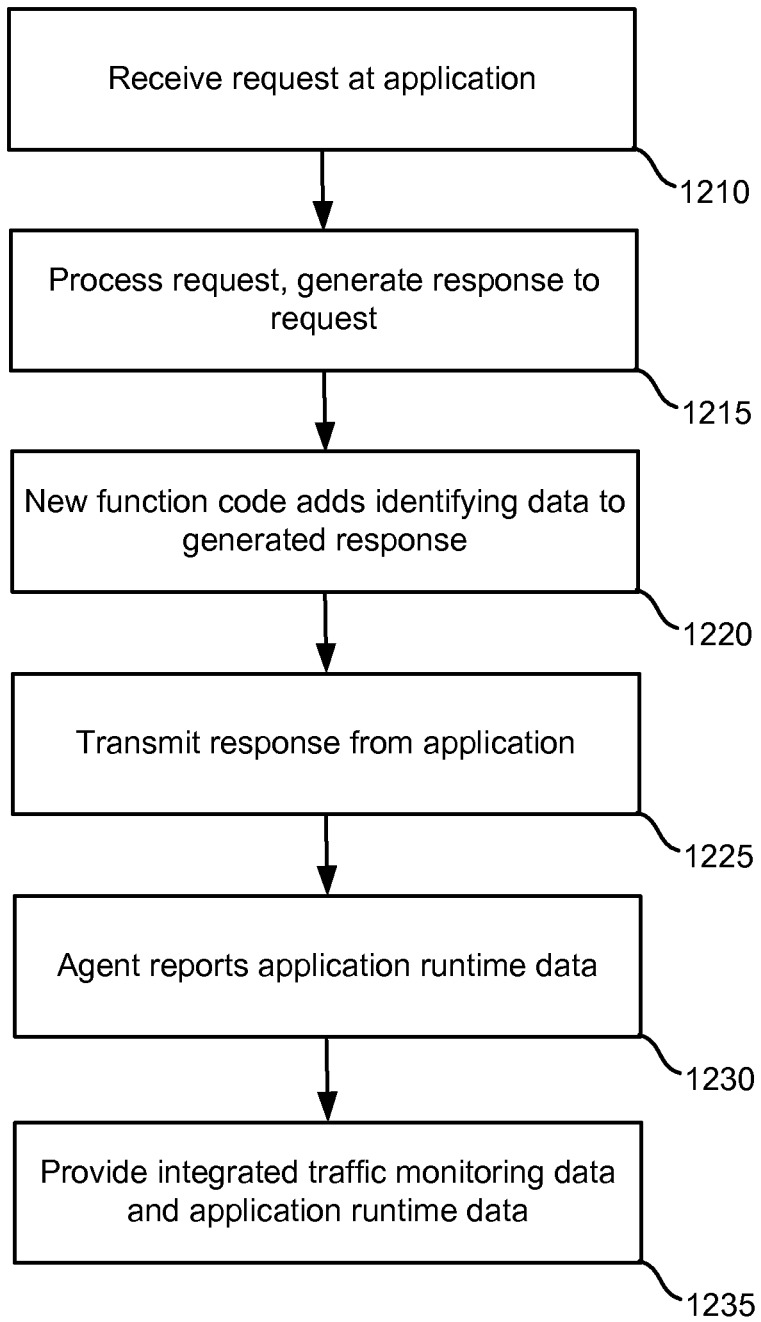
FIG. 12A is a flowchart of an embodiment of a process for processing an application request to associate traffic monitoring data with corresponding application runtime data.

FIG. 12A is a flowchart of an embodiment of a process for processing an application request to associate traffic monitoring data with corresponding application runtime data. One feature of the present technology involves integrating traffic monitoring data and application runtime data. In some embodiments, the integrated traffic monitoring data and application runtime data may be accessed through traffic monitoring system 180. In this approach, identifying data can be communicated to traffic monitoring system 180 from application monitoring system 190 or from another location to enable traffic monitoring system 180 to access application runtime data corresponding to traffic monitoring data for a particular request-response pair. For example, the identifying data may include index data, a request-response pair identifier and/or other information regarding the application runtime data. The identifying data may be communicated to system 180 by inserting the data into a response generated by an application, in one possible approach. In one embodiment, application monitoring system 190 may insert the identifying data into the response. The response and the identifying data may then be observed and processed by traffic monitoring system 180.

In one embodiment, FIG. 12A provides more detail of step 630 of FIG. 6. A request is received at an application at step 1210. The application processes the request and generates a response at step 1215 thereby forming a request-response pair. Processing the request may include performing actions by application code within application server 150 as well as accessing database server 151 or some other back-end server, e.g., by calling a servlet or EJB of the application.

Identifying data for the request-response pair is inserted into the generated response by new function code at step 1220. In some embodiments, the identifying data may be inserted into the response sometime before the response has been completely generated rather than after the response is completed. Other application-related information can also be provided in the response, including an application server ID, such as an IP address of the machine that the agent is running on, a virtual machine ID, which is a name associated with agent 152, a request handler ID, which is an entry point and/or a servlet name (servlet class name) which is involved in generating the response, and a servlet response time.

At step 1225, after adding the identifying data and other application-related information to the response, the response is transmitted from the application to network server 140, which may or may not perform additional processing of the response. After any further processing is performed, the response is sent by network server 140 to client 110. Traffic monitoring system 180 may observe and process the response such as by determining transaction components associated with the response, determining if the response is part of a defective transaction, and incorporating the response into defect and transaction statistics as discussed above with reference to FIG. 7. Moreover, the identifying data may be retrieved from the response and used to retrieve application runtime data associated with the response. The application-related information can also be retrieved. For example, if it is determined that the response is part of a defective transaction, corresponding application runtime data may be identified from the identifying data. This is discussed in more detail below with respect to FIG. 12B.

Application runtime data is reported by agent 152 of application server 150 to Enterprise Manager 155 at step 1230. The application runtime data may be indexed to the identifying data added to the response as well as other application data regarding processing of a request by application 151. Integrated traffic monitoring data and corresponding application runtime data can be provided to the operator via an interface, for instance, at step 1235 as discussed in more detail below with respect to FIG. 12B. Essentially, the traffic monitoring data and application performance data can be cross-referenced to one another to allow the operator to easily access both types of data to provide an enhanced understanding of network and application activity.

Figure 12B:
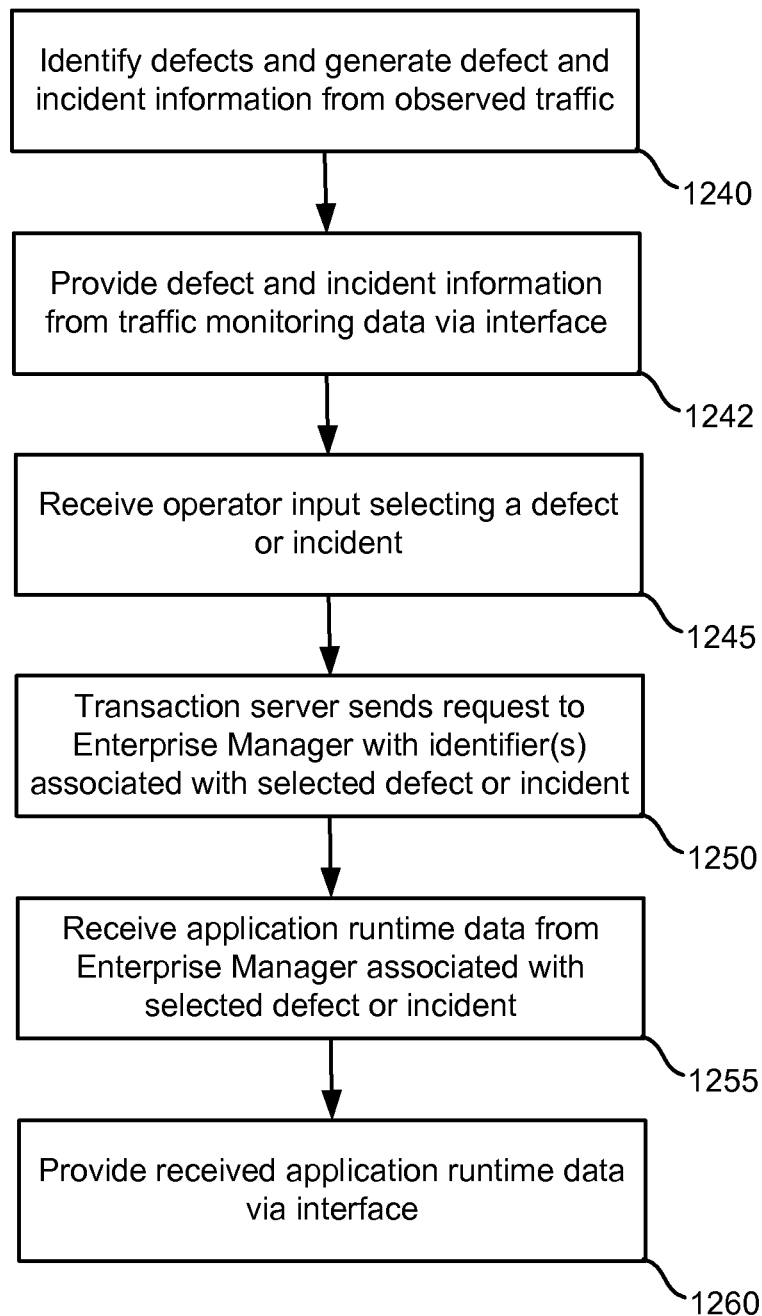
FIG. 12B is a flowchart of an embodiment of a process for associating application runtime data with corresponding traffic monitoring data.
Figure 12C:
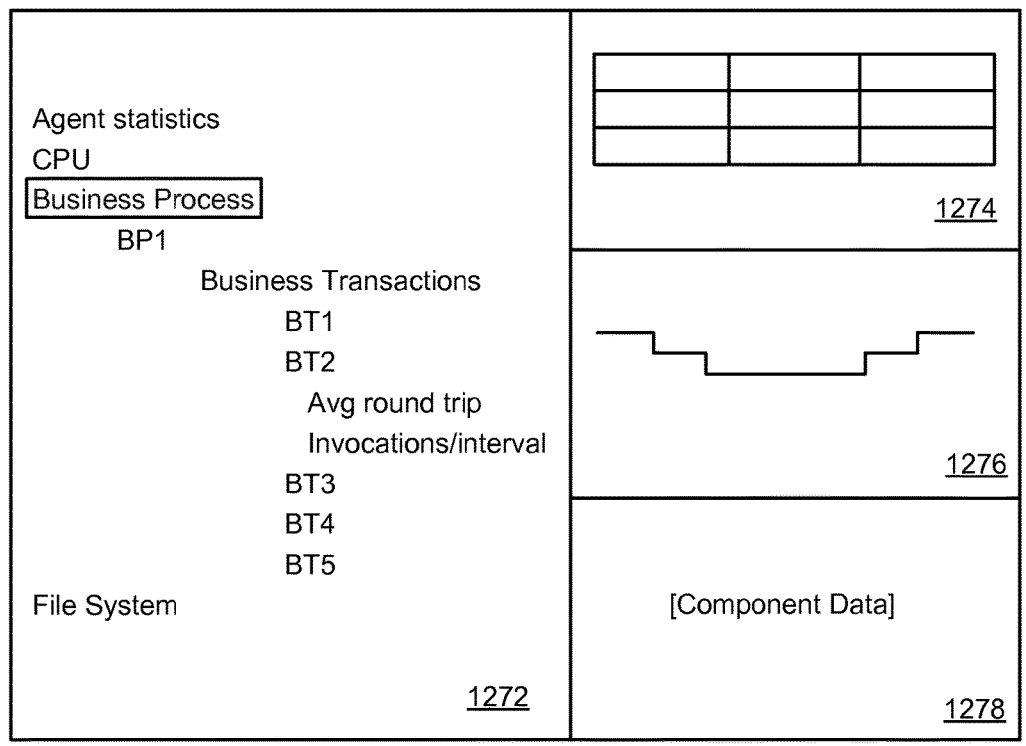
FIG. 12C is an example interface for displaying traffic monitoring data and application runtime data.

FIG. 12B is a flowchart depicting an embodiment of a process for associating application runtime data with corresponding traffic monitoring data. In one embodiment, the flowchart of FIG. 12B provides more detail for step 1235 of the process at FIG. 12A. Defects and incidents are identified and associated information is generated from the traffic monitoring data at step 1240. In one embodiment, this step is performed by traffic monitor 160 and transaction server 164. Step 1240 may include performing steps 710-730 of the process of FIG. 7 as discussed above. Identification of defects is discussed above with respect to step 950 of the flowchart at FIG. 9.

Next, data associated with the generated defects or incidents may be provided to an operator at step 1242, e.g., through an interface provided within browser 382 (FIG. 3). The interface content is provided to browser 382 by admin console 380. The operator can provide an input through the interface selecting a particular defect or incident for which application runtime data is desired, at step 1245. In response, transaction server 164 sends a request to Enterprise Manager 155 with identifying data associated with the selected defect or incident at step 1250. As mentioned, such identifying data may have been previously retrieved by traffic monitoring system 180 from a response provided to client 110, in one approach. For example, the identifying data may be associated with a request-response pair associated with a defect or one or more request-response pairs associated with one or more defects which triggered an incident. In another embodiment, transaction server 164 may send business transaction or transaction ID information to Enterprise Manager 155. In this case, Enterprise Manager 155 may have a mapping of business transaction or transaction ID to application runtime data. Enterprise Manager may then use the mapping to identify application runtime data associated with the selected defect or incident. In any case, when a request for application runtime data is received by Enterprise Manager 155 from transaction server 164, Enterprise Manager 155 gathers the requested data and sends it to transaction server 164.

Transaction server 164 receives the requested application runtime data associated with the selected defect or incident at step 1255. In one embodiment, the application runtime data is provided in an interface based on a hierarchy represented by a tree having a number of nodes. A portion of the application runtime data which is associated with a selected level of the hierarchy can be displayed based on a selected node. In some embodiments, the application runtime data may be received in some other format. Once the requested application runtime data is received, it is provided to the operator through the interface or some other means at step 1260.

In some embodiments, traffic monitoring data, such as statistics, defect and incident data derived from observed traffic, along with application runtime data, may be accessed through application monitoring system 190. In some embodiments, the application runtime data and/or corresponding traffic monitoring data can be displayed based on a hierarchy represented by a tree. A representative example of an interface for providing such a display, illustrated in FIG. 12C, includes display regions 1272, 1274, 1276 and 1278. Display region 1272 represents the hierarchy as a tree with selectable nodes. "RT" denotes response time. The tree has the following form, in one possible approach:

```
Domain
    Business Processes
        Business_Process1
            Business Transactions
                Business_Transaction1
                    Average Response time (ms)
                    Errors Per Interval
                    Invocations Per Interval
                Business_Transaction2
                    Average Response time (ms)
                    Errors Per Interval
                    Invocations Per Interval
        Business_Process2
```

Thus, the tree can organize the presentation of application runtime data and/or traffic monitoring data based on a hierarchy which includes a domain, business processes, business transactions and other nodes. Display region 1274 illustrates a representative table without data. The table in an actual interface may have information regarding defects of an incident which has been classified to the selected level of the hierarchy, for instance. An operator can select any of the rows of the table to have the corresponding trace displayed in the display region 1276, which includes a simplified representation of trace. Display region 1278 may provide other details regarding the invoked application components, such as an identifier of the request-response pair associated with the selected trace and other component data.

Figure 13:
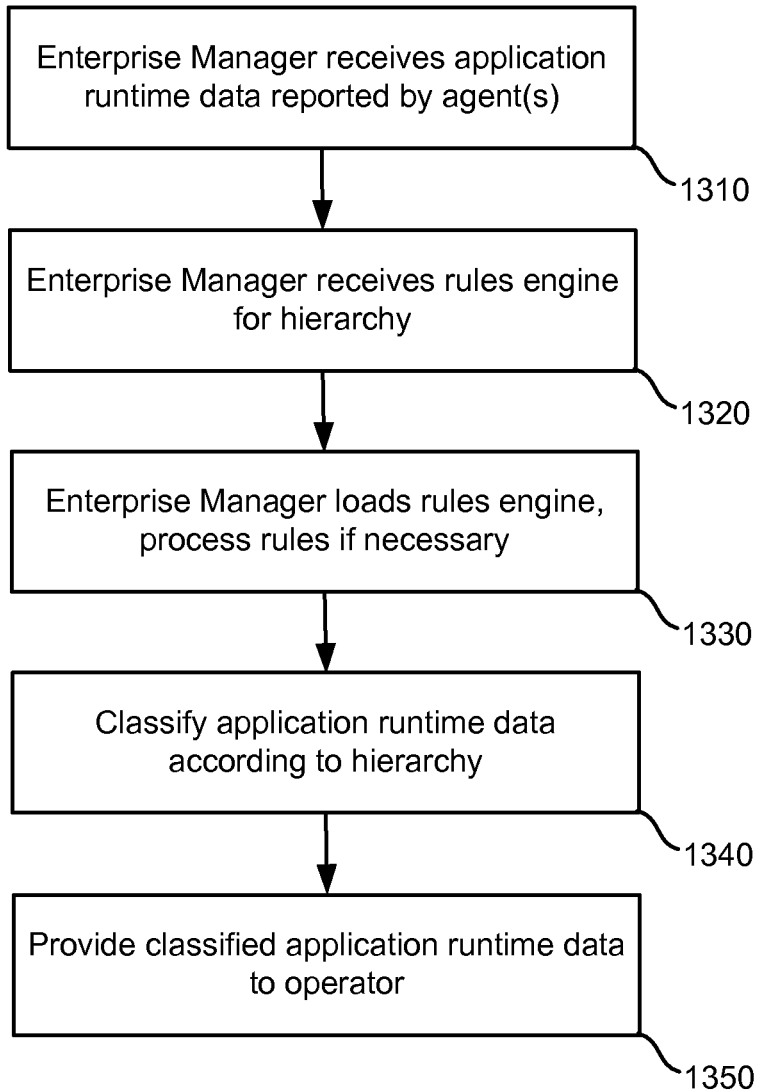
FIG. 13 is a flowchart of an embodiment of a process for providing traffic monitoring data and corresponding application runtime data to an operator via an interface.

FIG. 13 is a flowchart of an embodiment of a process for providing integrated traffic monitoring data and corresponding application runtime data to an operator through application monitoring system 190. In some embodiments, the process of FIG. 13 provides more detail for step 630 of the process of FIG. 6. Application runtime data reported by agent 152 is received by Enterprise Manager 155 at step 1310. The application runtime data can be associated with request-response pairs and can be reported as discussed above with respect to step 1230 of FIG. 12A.

Next, a rules engine for a hierarchy is received by Enterprise Manager 155, e.g., from transaction server 164, at step 1320. The set of rules can be generated by traffic monitoring system 180 in response to observed traffic and operator inputs. In some embodiments, the rules engine can be shared with the application monitoring system once, periodically, or at some other rate with respect to integration of data between traffic monitoring system 180 and application monitoring system 190.

In one embodiment, the rules engine may be generated from an XML file and can provide information for associating transactions with one or more levels of a hierarchy. In particular, the rules engine may provide classification rules and/or descriptions for identifying a domain, business processes within the domain, business transactions within the business processes, transactions within the business transactions and transaction components within the transactions. For example, the rules engine may describe HTTP request characteristics associated with a particular transaction, such as a URL host name, URL parameters, HTTP post parameters, cookie parameters and session manager parameters for each transaction.

The rules engine is loaded by Enterprise Manager 155 at step 1330. The rules can be modified, if necessary, to generate a modified rules engine which is tailored to the needs of the application monitoring system. For example, Enterprise Manager 155 may generate a modified set of rules to identify transaction components, e.g., by parsing the set of rules of the received rules engine. To this end, a configuration file which is used to generate the rules engine may include header information identifying each transaction component definition and body information containing the details of the transaction component definitions, such as name/value pairs that are associated with a transaction component. When the header information is detected during parsing, the information in the body is read and stored. A rule is then derived from the transaction component definition body portion.

Modified rules for identifying a transaction, business transaction, business process, domain and optionally other information can similarly be generated to provide the modified rules engine. The rules to identify the different levels of the hierarchy are derived from the portions of the rules engine which describe the corresponding elements. In one embodiment, the hierarchy can be represented by a tree having nodes which define the different levels of the hierarchy. In some embodiments, the rules engine used by the application monitoring system can be shared with traffic monitoring system 180.

Application runtime data may be classified according to the hierarchy at step 1340. For example, a transaction component may be associated with a request received and processed by application server 150. See the discussion above regarding step 102 (FIG. 1B) regarding binding of transaction components to the hierarchy. Step 102 can be applied equally by the traffic monitoring system using its rules engine or by the application monitoring system using its rules engine. Or, the traffic monitoring system and the application monitoring system can use the same rules engine.

In particular, application runtime data generated for each request received and processed by an application may be associated with a transaction component. The request received by the application includes parameter data associated with a transaction component. The parameter data may include, e.g., URL host name, URL parameters, HTTP post parameters, cookie and/or session manager parameters for each transaction. The agent, for instance, can compare the parameter data against the set of rules identifying a transaction component. If the parameter data matches a transaction component rule, the request is associated with the particular component. Optionally, the comparison can be made by the Enterprise Manager 155 or other entity.

For example, consider a business process for purchasing a book through a web site. This business process may include business transactions of performing a login, shopping to select a book, adding a selected book to a cart, and proceeding to checkout where payment information is entered. The business transaction of proceeding to checkout may include a request for a checkout content page and a response which provides the checkout page; the request for the checkout page may be processed by a checkout servlet within the monitored application. The rules engine received at step 1320 can identify the "checkout" transaction by URL host name (web server name), URL parameters (the URL itself), HTTP post parameters (parameters passed in the request), cookie parameters (cookies maintained, created or deleted as a result of the request) and/or session manager parameters (name/value pairs obtained from a session manager). Application runtime data reported at step 1310, which indicates the checkout servlet has processed a request, may include servlet identification information as well as URL host name, URL parameters, HTTP post parameters, cookie parameters and/or session manager parameters associated with the request processed by the servlet. These parameters will match the parameters for the checkout transaction, and the servlet will be associated with the transaction component at step 1340.

Moreover, because the transaction component is part of a transaction, a transaction is part of a business transaction, a business transaction is part of a business process and a business process is part of a domain, in the example hierarchy, the servlet can be associated with those additional levels of the hierarchy as well at step 1340.

A received request can be marked or otherwise associated with a transaction and business transaction. The reported application runtime data classified according to the hierarchy is then provided to an operator by Enterprise Manager 155 at step 1350. In one embodiment, the application runtime data may include average response time, errors per interval, method invocations per interval and other information for a transaction. This information can be provided along with the hierarchy information corresponding to the transaction and may be reported to an operator, e.g., through an interface provided by workstations 410 or 420 or other machines (not pictured).

Metric Calculation for Business Transactions

The system of FIGS. 1A and/or 1D may be used to calculate metrics from information acquired during execution of a transaction for transactions that cannot be identified during execution. The transaction metrics provide information for the transaction associated with transaction execution and can be aggregated by transaction and time period. Once the transaction has completed, transaction identification information is appended to a set of data that includes the transaction metrics and the metrics can be reported for a time period once all transactions executing in that time period have completed.

Figure 14:
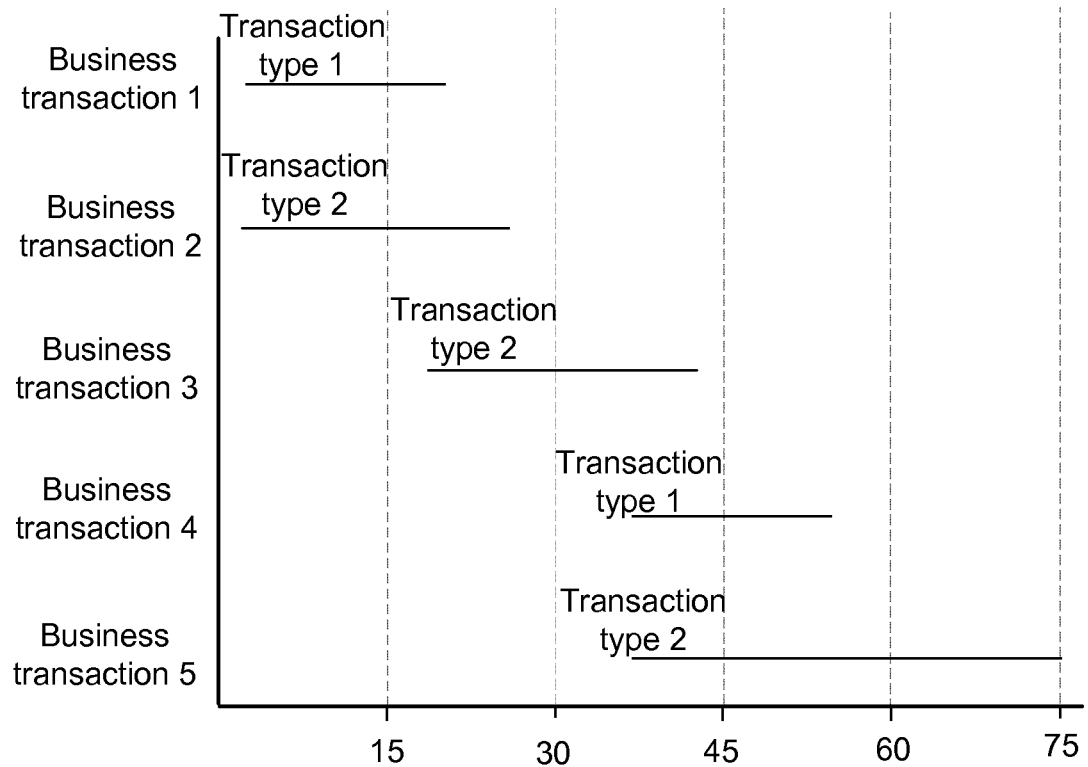
FIG. 14 is an example of a graphic illustrating the execution time of business transactions over time.

FIG. 14 is an example of a graphic illustrating the execution of business transactions over time. FIG. 14 illustrates five business transactions executing over a 75 second time line divided into 15 second time periods. Each of the five business transactions are either a type one transaction or a type two transaction. In particular, business transactions one and four are type one transactions while business transactions two, three and five are type two transactions.

The five business transactions execute for some period of time between 0 and 75 seconds, and extend over two or more 15 second time periods. The time periods end at 15, 30, 45, 60 and 75 seconds. During the first time period, business transaction one and business transaction two begin execution. During the second time period of 15-30 seconds, business transaction one and two complete execution and business transaction three begins execution. During the third time period, business transaction three ends execution and business transaction four and five begin execution. During the fourth time period, business transaction four ends and business transaction five continues execution. Business transaction five ends execution during the fifth time period of 60-75 seconds.

As discussed above, concurrency and stall data is not reported for a time period until each transaction executing in that time period has completed. For example, the time period of 0-15 seconds in FIG. 15 includes business transaction one and business transaction two. Data for stall and concurrency is not reported for these transactions until all executing transaction types within the time period have completed. Since business transaction one and business transaction two do not complete until the next time period of 15-30 seconds, concurrency and stall data is not determined for transactions in the first time period until business transaction two completes in the time period ending at 30 seconds. This is discussed in more detail below.

Figure 15:
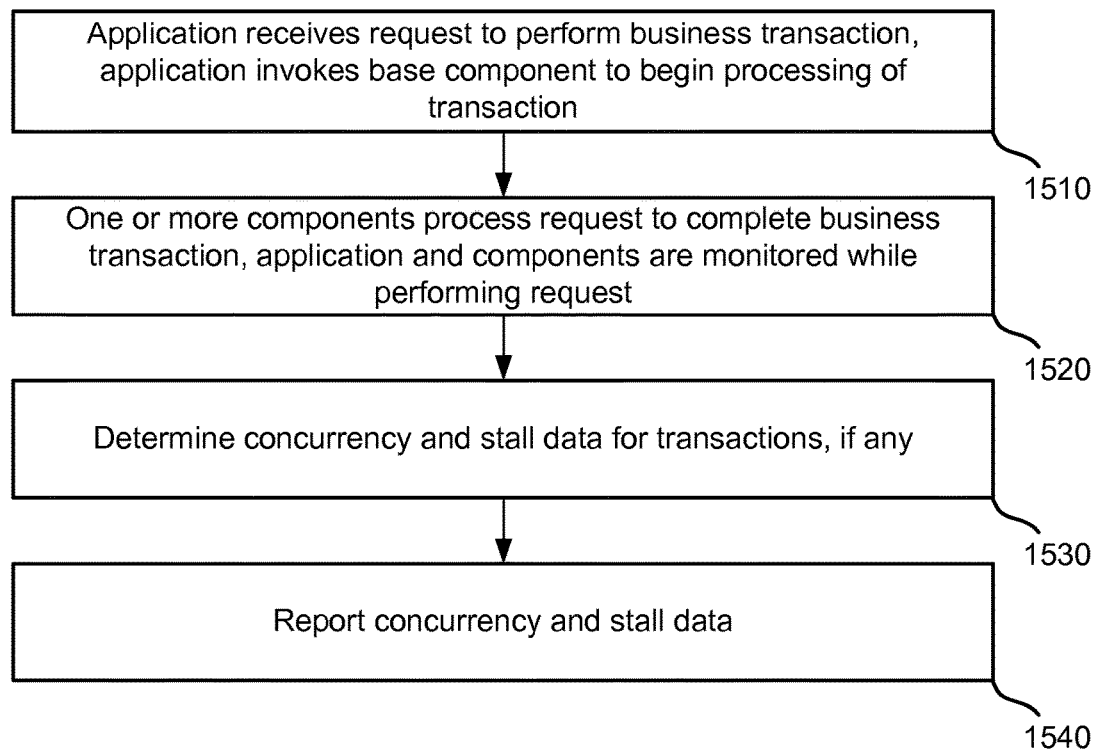
FIG. 15 is a flowchart of an embodiment of a method for generating concurrency and stall data for business transactions.

FIG. 15 is a flowchart of an embodiment of a method for generating concurrency and stall data for business transactions. First, an application receives a request to perform a business transaction and the application invokes a base component to begin processing the transaction at step 1510. The request may be initiated by client 110 or some other device and eventually received by an application on application server 150.

One or more components may process the request to complete the business transaction at step 1520. The application and/or components processing the request are monitored while performing the transaction in response to the request. The components and application may be monitored with probes inserted into an application and/or application components. The inserted code may be inserted using byte code instrumentation as discussed above. Monitoring an application and/or application components while processing the request is discussed in more detail below with respect to FIG. 16.

Concurrency and stall data is determined for transactions, if any, at step 1530. The concurrency and stall data is determined after each transaction occurring during a time period is complete. Determining concurrency and stall data is discussed in more detail below with respect to FIG. 17.

After determining concurrency and stall data, the concurrency and stall data is reported at step 1540. The data may be reported through one or more of several reporting mechanisms, such as a user interface of a workstation, e-mail, pager, a text message, voice message or other message through a mobile device, a printer, facsimile, or by some other mechanism. In some embodiments, reporting the data may include saving the data locally or remotely to a data store, repository or some other data source.

Figure 16:
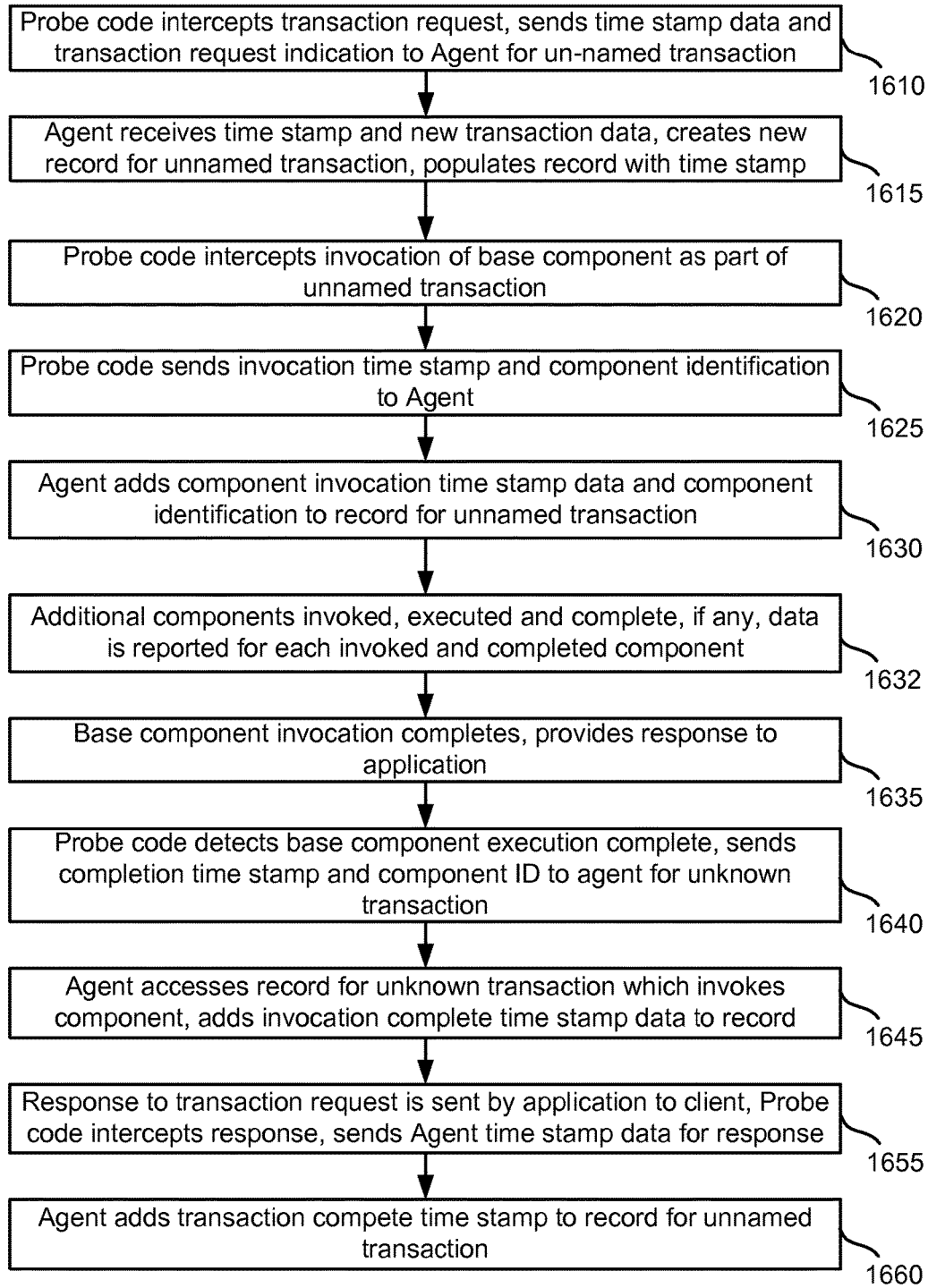
FIG. 16 is a flowchart of an embodiment of a method for monitoring a business transaction.

FIG. 16 is a flowchart of an embodiment of a method for monitoring a business transaction. In some embodiments, the method of FIG. 16 provides more detail for step 1520 of the method of FIG. 15. First, probe code intercepts a transaction request and sends data to agent 152 for an unnamed transaction at step 1610. The data sent may include time stamp data and an indication of a transaction request. The time stamp may indicate the time of the transaction invocation. The transaction may be unnamed because determining the name may cause an error or otherwise not be appropriate. For example, the request may be a post request received from a client device and determining the name of the transaction may cause the transaction to fail.

Agent 152 receives the time stamp and new transaction data, creates a new record (or stores some other set of data) for the transaction and populates the record with the received data at step 1615. The new record does not indicate the name of the transaction identified at step 1610. Rather, agent 152 will generate a record and optionally create an internal identifier for the application. The application name can be determined later by agent 152.

An invocation of a base component as part of the unnamed transaction is intercepted by probe code within the component at step 1620. After intercepting the invocation of the component, the probe code within the component sends the invocation time stamp and component identification information to agent 152 at step 1625. The agent receives the data and adds the component invocation time stamp data and component identification to the created record for the unnamed transaction at step 1630. After invoking the base component, additional components may be invoked, execute and complete execution to perform the transaction and data is reported for each component at step 1632. The data reported includes timing data for invocation and execution completion, component identification data, and optionally other data.

The base component invoked completes and a response is then provided to the invoking entity at step 1635. Upon detecting that execution of the base component is complete, probe code within the based component sends completion time stamp data and any component identification information to agent 152 at step 1640. The agent receives the data, accesses the record for the unknown transaction and adds the invocation complete time stamp data and other data to the record for the unnamed transaction at step 1645.

A response to the transaction request is sent by the application at step 1655. Probe code within the application may intercept the response and send time stamp data for the response to agent 152. The agent receives the data and adds the transaction complete time stamp data to the created record for the unnamed transaction at step 1660. At this point, monitoring of the particular unnamed transaction is complete.

Figure 17:
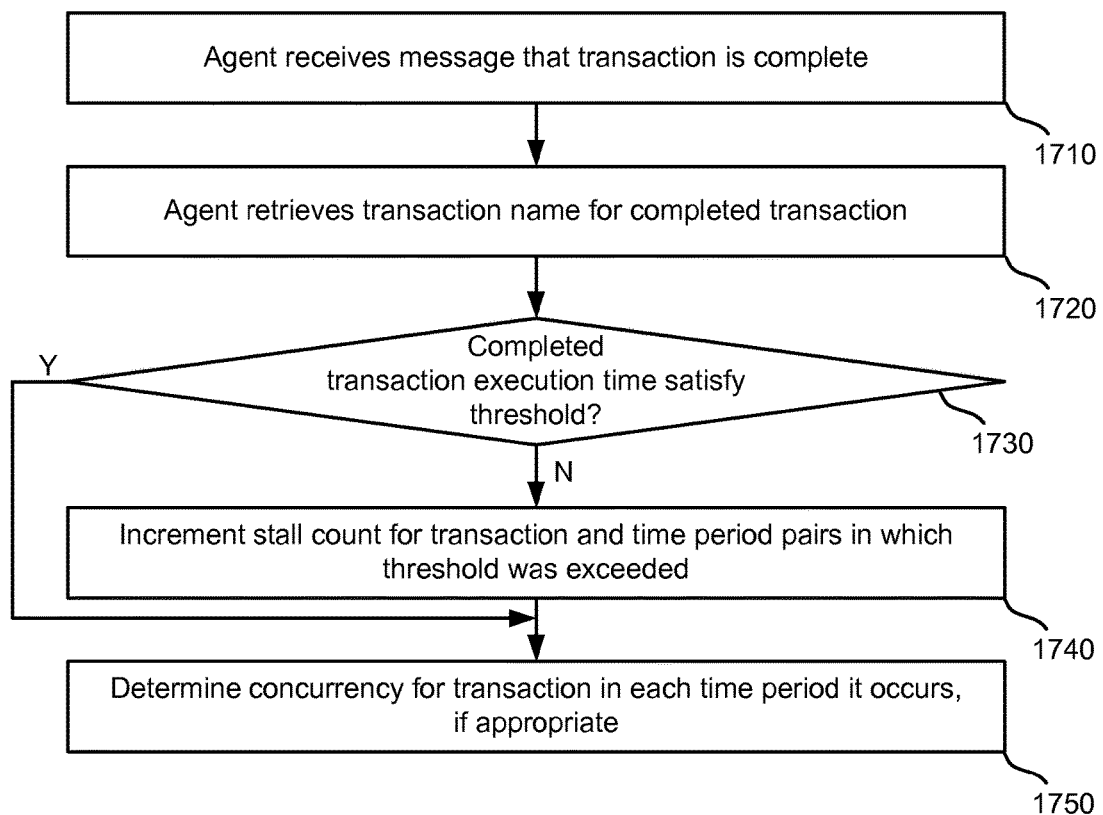
FIG. 17 is a flowchart of an embodiment of a method for determining stall and concurrency data for a business transaction.

FIG. 17 is a flowchart of an embodiment of a method for determining stall and concurrency data for a business transaction. In some embodiments, the method of FIG. 17 provides more detail for step 1530 of the method of FIG. 15. First, agent 152 receives a message that the transaction is complete at step 1710. The message is sent by probe code within an application at step 1655 in the method of FIG. 16.

Next, agent 152 retrieves a transaction name for the completed transaction step at step 1720. Agent 152 may retrieve the transaction name from Enterprise manger 155. Enterprise manager may correlate performance data originally provided by or derived from data provided by agent 152 with traffic monitoring data provided by traffic monitoring system 180. Thus, to determine the transaction name, agent 152 may provide a selected set of performance data associated with the transaction as one or more parameters in a query to Enterprise Manager 155. For example, agent 152 may provide a query to Enterprise Manager 155 for the transaction name associated with the invocation of a particular base component at a particular invocation time, execution completion time, or some other performance data associated with the transaction that was stored in the transaction record. In some embodiments, a transaction identifier may be added to a response generated by an application. The traffic monitoring system may store the transaction name with the transaction identifier when the response is sent back to the requesting client. Agent 152 may access the transaction identifier placed in the response and send the transaction identifier to Enterprise Manager 155, which may then query traffic monitoring system 180 for the transaction name associated with the transaction identifier. In any case, Enterprise Manager 155 may receive a transaction name query from agent 152, determine the name of the transaction from the query parameters and provide the transaction name to the agent. Determining transaction data from performance data is discussed in more detail with respect to FIGS. 12A-13.

After retrieving the transaction name information, a determination is made as to whether the completed transaction execution time satisfies a threshold at step 1730. The threshold may be a stall threshold and may be satisfied if the transaction execution time is less than a stall threshold time. For example, if a transaction execution time is 45 seconds and stall threshold is 30 seconds, the transaction execution time does not satisfy the stall threshold and is considered a stall during the time period in which it exceeds the threshold and each time period thereafter in which it executes. If a completed transaction execution time does satisfy the threshold, the method of FIG. 17 continues to step 1750.

If the completed transaction execution time does not satisfy the stall threshold, a stall count for that transaction is incremented for each time period in which the transaction does not satisfy the threshold. Thus, the stall count may be incremented in each time period in during which the transaction is executing once the execution time for the transaction has exceeded the stall threshold. After incrementing the stall count for the appropriate periods, the method of FIG. 17 continues to step 1750.

Concurrency for the transaction in each time period is determined at step 1750, if appropriate. Concurrency for a transaction in a time period is determined when all transactions executing at some point during the time period are complete. For time periods in which one or more transactions are still executing (whether one or more transactions are executing in that time period or a subsequent one), the concurrency for transactions in that time period cannot be determined. Once all transactions executing in a time period have completed, concurrency for each transaction in that time period may be determined. Determining concurrency for transaction time period pairs is discussed in more detail below with respect to FIG. 18.

Figure 18:
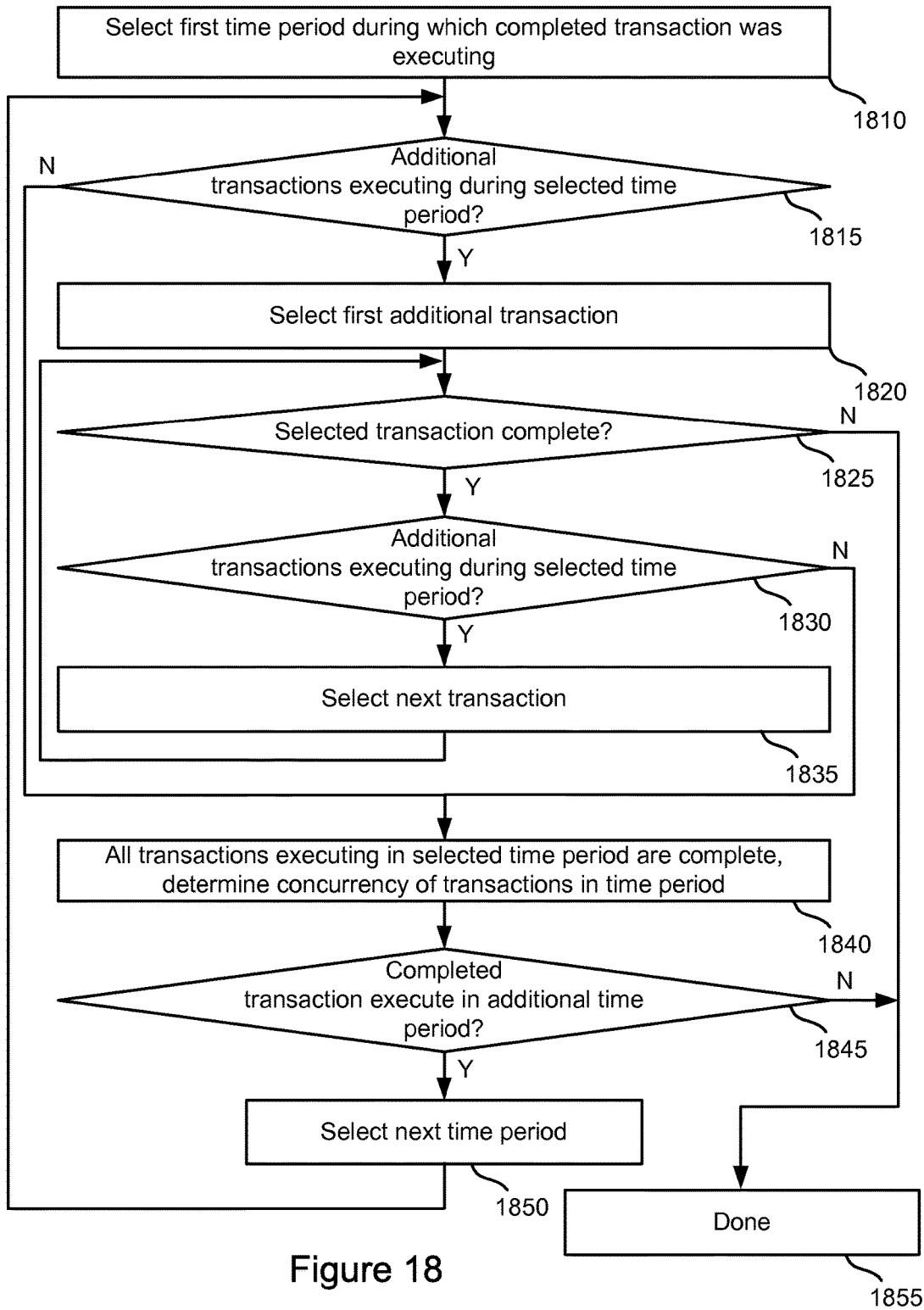
FIG. 18 is a flowchart of an embodiment of a method for determining whether to determine concurrency of business transactions for a time period.

FIG. 18 is a flowchart of an embodiment of a method for determining whether to determine concurrency of business transactions in a time period. In some embodiments, the method of FIG. 18 provides more detail for step 1750 of the method of FIG. 17. First, a first time period during which a completed transaction was executing is selected at step 1810. For example with respect to FIG. 14, the first time period during which completed business transaction one is executing is the time period ending at 15 seconds. If the completed transaction was business transaction four, the first time period during which the completed transaction was executing would be the time period of 30-45 seconds.

A determination is made as to whether additional transactions were executing during the selected time period at step 1815. For example, for the time period of 0-15 seconds and completed business transaction one, business transaction two was an additional transaction that was executing during the selected time period. In the third time period of 30-45 seconds and with completed business transaction four, business transaction three and business transaction five were also executing. If no additional transactions were executing during the selected time period, the method of FIG. 18 continues to step 1840. If additional transactions were executing, the first additional transaction is selected at step 1820 and a determination is made as to whether the additional transaction is complete at step 1825.

If the selected additional transaction is not complete at step 1825, then the method of FIG. 18 ends at step 1855. When the selected additional transaction is not complete, at least one additional transaction is still executing and concurrency data may not be determined for any transaction within the selected time period. If the selected transaction is complete, a determination is made as to whether there are additional transactions executing during the selected time period at step 1830. If additional transactions were executing during the selected time period at step 1830, the next transaction is selected at step 1835 and the method of FIG. 18 returns to step 1825. If no additional transactions were executing during the selected time period, the method of FIG. 18 continues to step 1840 where it is determined that all transactions executing in the selected time period are complete and the concurrency of the transactions in that selected time period are determined. Determining the concurrency of transactions in a selected time period at step 1840 is discussed in more detail below with respect to FIG. 19.

After determining concurrency, a determination is made as to whether the completed transaction executes in additional time periods at step 1845. Thus, steps 1815-1840 were performed for a particular time period. If the completed transaction was executing in additional time periods, the next time period is selected at step 1850 and the method of FIG. 18 returns to step 1815. If the complete transaction is not executed in any additional time periods, then the method of FIG. 18 is done and all concurrency information has been determined for the selected time period.

Figure 19:
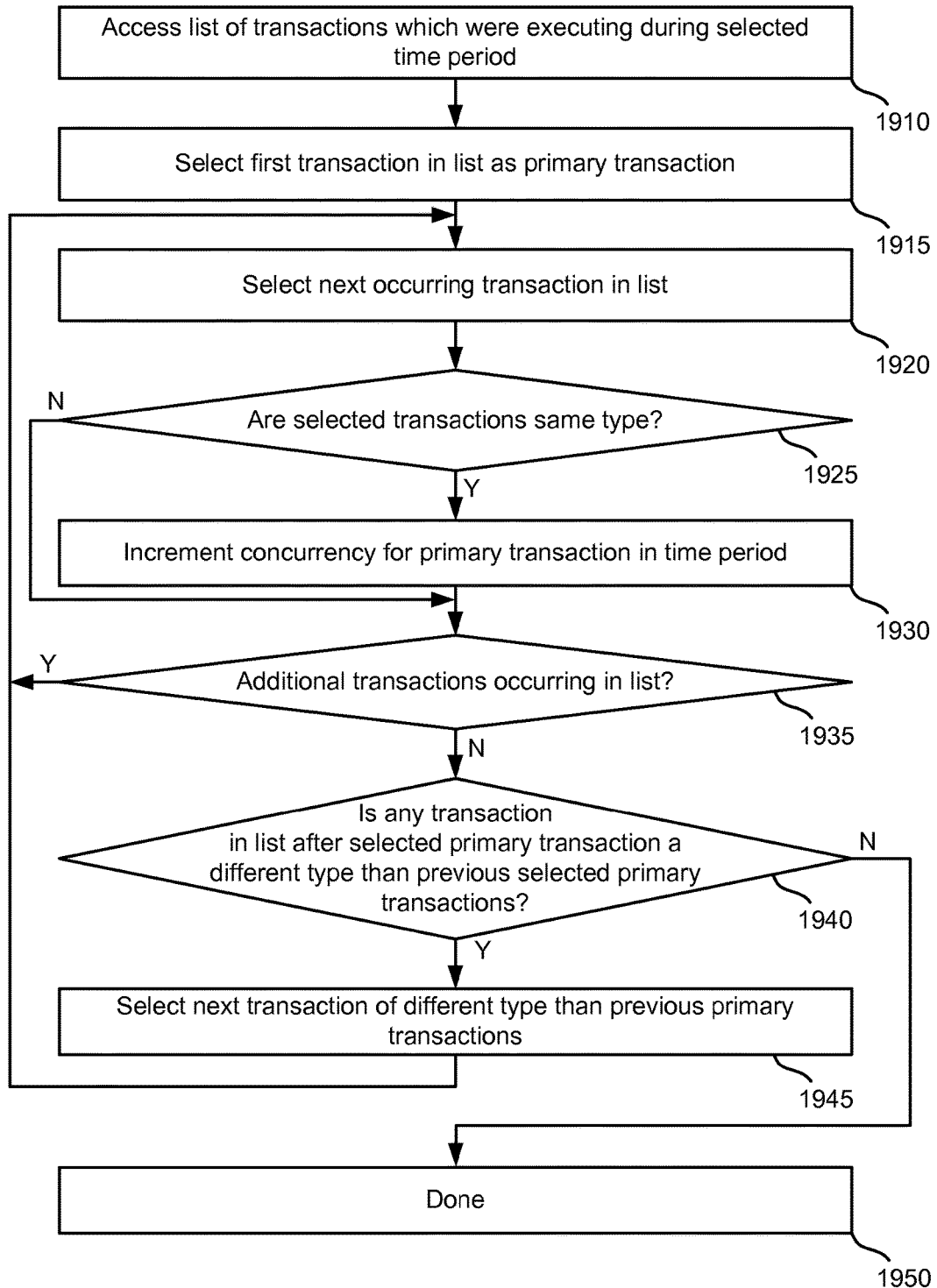
FIG. 19 is a flowchart of an embodiment of a method for determining concurrency for business transactions.

FIG. 19 is a flowchart of an embodiment of a method for determining concurrency for business transactions. In some embodiments, the method of FIG. 19 provides more detail for step 1840 of the method of FIG. 18. First, agent 152 accesses a list of transactions which were executing during the selected time period at step 1910. In some embodiments, the data may be stored locally by agent 152. Next, a first transaction in the list is selected as a primary transaction at step 1915 and the next occurring transaction in the list is selected at step 1920. A determination is then made as to whether the selected transactions are the same transaction type at step 1925. For example, with respect to FIG. 14, business transaction one and business transaction four of FIG. 14 are both of type one transactions. Examples of transaction types may be transactions with a same URL or a same type defined by a user (for example, a "check-out" type transaction or a "login" type transaction for an ecommerce web service). If the selected transactions are the same type, the concurrency for the primary transaction is incremented for the current time period at step 1930 and the method of FIG. 19 continues to step 1935. If the selected transactions are not the same type, the method of FIG. 19 continues to step 1935.

A determination is made as to whether there are additional transactions occurring in the list at step 1935. If there are additional transactions in the list, the method of FIG. 19 returns to step 1920 where the next occurring transaction in the list is selected. If there are no additional transactions in the list, the determination is made as to whether any transactions in the list after the selected primary transaction are of a different type than the previous selected primary transactions at step 1940. A determination at step 1940 determines if there are any different types of transactions occurring in the time period to determine concurrency for. If there are different types of transactions in the selected time period to determine concurrency for, the next transaction of a different type than the previous primary transactions is selected at step 1945 and the method of FIG. 19 returns to step 1920. The first occurrence of a different transaction type is selected at step 1945. If at step 1940 there are no transactions in the list having a different type than the previous primary transactions, then the method of FIG. 19 is complete at step 1950.

FIG. 20 is an example of stall and concurrency data taken at different times. The stall can concurrency data is based on the transactions illustrated in FIG. 14. The table of FIG. 20 includes columns of time elapsed, transaction, time period, stalls and concurrency. The time elapsed column includes data values of 15 seconds, 30 seconds, 45 seconds, 60 seconds and 75 seconds. For each time elapsed indicated in the table, data is provided for transaction types one and two for one or more time periods. For example, after 15 seconds have elapsed, it is indicated that for the time period ending in 15 seconds, neither transaction type one or transaction type two have any stalls or concurrency data values. With respect to FIG. 14, although there is one instance of transaction type one and one instance of transaction type two within the time period ending at 15 seconds, neither transaction has completed within that time period. Thus, the concurrency data cannot be determined and there is no information that either transaction has extended more than a stall threshold period of time.

After a time of 30 seconds has elapsed, it is shown that transaction type one and transaction type two have a concurrency value of "one" for the 15 second time period. This data is a result of recognizing that transaction type one and transaction type two corresponding to business transactions one and two both end in the second time period (which ends at 30 seconds). Though there are three pending transactions within the second time period which ends at 30 seconds, no data is provided for the second time period because at least one transaction (business transaction three) which executes during the third time period did not complete execution until after that time period. Business transaction three which occurs in the 15-30 second time period is still executing after an elapsed time of 30 seconds.

After 45 seconds has elapsed, every transaction in the second time period of 15-30 seconds has completed. Thus, the transaction type one concurrency value is one and the transaction type two concurrency value is two for the time period ending in 30 seconds. The concurrency value of one for transaction type one is based on business transaction one and the concurrency value of two for business transaction two. The table of FIG. 20 provides additional information for time periods after elapsed times of 45 seconds, 60 seconds and 75 seconds. In particular, the time period ending in 45 seconds, 60 seconds and 75 seconds have final concurrency values which may only be determined after 75 seconds because business transaction five executes during the third, fourth and fifth time period. Thus, no final concurrency values may be determined until business transaction completes at the end of time period five. Additionally, business transaction five lasts for over 30 seconds. With a stall threshold set at 30 seconds, transaction type two creates a stall count of one during the 60-75 second time period.

FIG. 21 is an example of a table of stall and concurrency data for different business transaction—time period pairs. The data is for the business transactions illustrated in FIG. 14. As indicated, the table of FIG. 21 provides stall and concurrency data for each transaction type for each time period. For example, transaction types one and two each have no stalls and a concurrency of one within the time period ending in 15 seconds. The transaction type one has a concurrency value of one while the transaction type two has a concurrency value of two in the time period which ends in 30 seconds. The transaction type one has a concurrency value of one in the time period which ends in 45 seconds and the time period that ends in 60 seconds. The type two transaction has a concurrency value of two in a time period which ends in 45 seconds and a concurrency value of one in the time period which ends in 60 seconds. In the time period which ends in 75 seconds, the transaction type one has no stalls and no concurrency values and transaction type two has a value of one concurrency and a stall count of one.

In some embodiments, reporting data may include one or more mechanisms which more efficiently communicate changes in data. For example, if there are initially no stalls and no concurrencies for a particular transaction type, this may be indicated by not transmitting any concurrency or stall data upon detecting that a transaction has been invoked or has begun. Further, if there is no change in a stall or concurrency count for a particular time period, the no change state may be communicated by not providing any information for a particular time period for a particular transaction type. In this case, the stall and concurrency counts for the transaction for a particular time period will be considered to be the same for that transaction type as in the previous time period. Additionally, memory leaks may also be handled by the current system. For example, if a transaction stall lasts for longer than a certain period of time, for example five minutes, the monitoring system may trigger a timeout event in order to effectively end the execution of the transaction.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A computer implemented method, comprising:
monitoring performance of transactions performed at least in part by an application that executes on a processor, the monitoring occurring over a plurality of time intervals, the monitoring comprising creating records for application runtime data for the transactions, the transactions comprising types of transactions that are defined by transaction definitions comprising name/value pairs of parameters in network traffic, the type of transaction for respective ones of the transactions cannot be determined during execution of the respective transaction without risking the respective transaction to fail, when initially created the records do not indicate the type of transaction;
determining, by code that executes on a processor, the type for each respective transaction after the respective transaction completes execution and adding the type of transaction to the records, comprising accessing parameters in the network traffic and pattern matching name/value pairs of the parameters in the network traffic to the transaction definitions;
determining when all transactions being monitored during a given time interval of the plurality of time intervals are complete, based at least in part on the records;
determining, by code that executes on a processor, a concurrency for each type of transaction during the given time interval after all transactions being monitored during the given time interval are complete;
reporting the concurrency for each type of transaction for the given time interval;
repeating, for additional time intervals of the plurality of time intervals, the determining when all transactions being monitored during a given time interval are complete and determining a concurrency for each type of transaction during the given interval; and
reporting the concurrency of each type of transaction during the additional time intervals.

2. The computer implemented method of claim 1, wherein at least one of the transactions which was executing during the given time interval completes after the given time interval has ended.

3. The computer implemented method of claim 1, wherein said determining a concurrency for each type of transaction during the given time interval includes:
incrementing a concurrency value for transactions that are the same type of transaction.

4. The computer implemented method of claim 1, where a concurrency value is determined for a first type of transaction for each of the additional time intervals.

5. The computer implemented method of claim 1, further comprising:
determining a stall count for transactions that executed during the given time interval.

6. The computer implemented method of claim 5, wherein said determining a stall count includes:
incrementing the stall count for each transaction of a first type that executed in the given time interval that has not satisfied a stall threshold.

7. The computer implemented method of claim 6, wherein the stall threshold is a period of time.

8. The computer implemented method of claim 1, further comprising:
reporting metrics associated with the performance of the transactions performed by the application.

9. The computer implemented method of claim 1, where said monitoring includes:
instrumenting bytecode of the application to insert code into the application that monitors the application.

10. The method of claim 1, wherein the transaction definitions comprise name/value pairs of parameters in HTTP post requests in the network traffic.

11. A computer implemented method for determining metrics, comprising:
determining performance data for transactions performed by an application that executes on one or more computer systems, the transactions performed in response to requests in network traffic, wherein respective ones of the transactions cannot be identified during execution of the respective transaction without a risk of failure of the respective transaction, the determining performance data includes creating records for application runtime data for the transactions and occurs over a plurality of consecutive time periods, when initially created the records do not indicate the type of transaction;
monitoring, by code that executes on one or more processors, for completion of respective ones of the transactions based at least in part on the records;
retrieving identification data for the respective ones of the transactions in response to detecting the respective transaction is complete, comprising correlating the performance data for respective ones of the transactions to the network traffic and pattern matching name/value pairs of parameters in the network traffic to transaction type definitions;
adding the type of transaction to the records in response to retrieving the identification data;
selecting a first time period of the plurality of consecutive time periods for which all transactions that were executing in the first time period have completed;

determining, by code that executes on one or more processors, a concurrency for the transactions that executed during the first time period after all those transactions are complete;

repeating, for additional time periods of the plurality of consecutive time periods, the selecting a time period for which all transactions have completed and determining a concurrency for transactions that executed in the additional time period;

reporting the concurrency of each type of transaction during the first time period and the additional time periods; and based on the performance data, reporting performance metrics for each type of transaction during the first time period and the additional time periods.

12. The computer implemented method of claim 11, further comprising:

comparing the time of execution of the transactions that are the same type of transaction and that executed in the first time period to a stall threshold to determine which of the transactions stalled during the first time period; and incrementing a stall count for each of the transactions that were stalled during the first time period.

13. The computer implemented method of claim 11, further comprising:

selecting a second time period of the one or more consecutive time periods during which a first transaction of the transactions performed by the application was executing;

determining whether all transactions in a second set of additional transactions that were performed by the application and that executed during the second time period have completed; and calculating metrics for the first transaction and the second time period if all transactions in the second set of transactions that were executing during the second time period have completed.

14. One or more non-transitory processor readable storage devices having processor readable code embodied on said one or more non-transitory processor readable storage devices, said processor readable code for programming one or more processors to:

monitor performance of transactions performed at least in part by an application that executes on a processor, the monitoring occurring over a plurality of time intervals, said processor readable code for programming one or more processors to monitor performance for programming one or more processors to create records for application runtime data for the transactions, the transactions comprising types of transactions that are defined by transaction definitions comprising name/value pairs of parameters in network traffic, the type of transaction for respective ones of the transactions cannot be determined during execution of the respective transaction without risking the respective transaction to fail, when initially created the records do not indicate the type of transaction;

determine the type for each respective transaction after the respective transaction completes execution, comprising processor readable code for programming the one or more processor to correlate the application runtime data for respective ones of the transactions to the network traffic and match name/value pairs of parameters in the network traffic to the transaction definitions;

add the type of transaction to the records in response to determining the type for each respective transaction;

determine when all transactions being monitored during a given time interval of the plurality of time intervals are complete, based at least in part on the records;

determine a concurrency for each type of transaction during the given time interval after all transactions being monitored during the given time interval are complete;

report the concurrency for each type of transaction for the given time interval;

repeat, for additional time intervals of the plurality of time intervals, the determining when all transactions being monitored during a given time interval are complete and determining a concurrency for each type of transaction during the given interval; and report the concurrency of each type of transaction during the additional time intervals.

15. A monitoring system, comprising:

one or more computing devices having one or more processors configured to:

monitor performance of transactions performed at least in part by an application that executes on a processor, the monitoring occurring over a plurality of time intervals, the monitoring comprising creating records for application runtime data for the transactions, the transactions comprising types of transactions that are defined by transaction definitions comprising name/value pairs of parameters in network traffic, the type of transaction for respective ones of the transactions cannot be determined during execution of the respective transaction without risking the respective transaction to fail, when initially created the records do not indicate the type of transaction;

determine the type for each respective transaction after the respective transaction completes execution and add the type of transaction to the records, to determine the type of transaction the one or more processors are configured to access parameters in the network traffic and pattern match name/value pairs of the accessed parameters in the network traffic to the transaction definitions;

determine when all transactions being monitored during a given time interval of the plurality of time intervals are complete, based at least in part on the records;

determine a concurrency for each type of transaction during the given time interval after all transactions being monitored during the given time interval are complete;

report the concurrency for each type of transaction for the given time interval;

repeat, for additional time intervals of the plurality of time intervals, the determining when all transactions being monitored during a given time interval are complete and determining a concurrency for each type of transaction during the given interval; and report the concurrency of each type of transaction during the additional time intervals.

16. The monitoring system of claim 15, wherein the transactions that cannot be determined during execution of the respective transaction without risking the respective transaction to fail are associated with post requests.

17. The monitoring system of claim 15, wherein the transaction definitions comprise name/value pairs of parameters in post requests in the network traffic.

* * * * *